United States Patent
Park et al.

(10) Patent No.: US 12,296,490 B2
(45) Date of Patent: May 13, 2025

(54) END DEVICE, THREE-PARTY COMMUNICATION SYSTEM COMPRISING CLOUD SERVER AND EDGE SERVER FOR CONTROLLING END DEVICE, AND OPERATION METHOD THEREFOR

(71) Applicant: NAVER CORPORATION, Seongnam-si (KR)

(72) Inventors: Kay Park, Seongnam-si (KR); Jungheok Kim, Seongnam-si (KR); Sangok Seok, Seongnam-si (KR); Inhyeok Kim, Seongnam-si (KR)

(73) Assignee: NAVER Corporation, Gyeonggi-do (KR)

( * ) Notice: Subject to any disclaimer, the term of this patent is extended or adjusted under 35 U.S.C. 154(b) by 481 days.

(21) Appl. No.: 17/358,836

(22) Filed: Jun. 25, 2021

(65) Prior Publication Data
US 2021/0323159 A1    Oct. 21, 2021

Related U.S. Application Data

(63) Continuation of application No. PCT/KR2020/000077, filed on Jan. 3, 2020.

(30) Foreign Application Priority Data

Jan. 3, 2019    (KR) ................. 10-2019-0000546
Feb. 22, 2019   (KR) ................. 10-2019-0021200
Dec. 26, 2019   (KR) ................. 10-2019-0174936

(51) Int. Cl.
    *B25J 9/16*    (2006.01)
    *H04L 67/10*   (2022.01)
    (Continued)

(52) U.S. Cl.
    CPC ............. *B25J 9/1689* (2013.01); *H04L 67/10* (2013.01); *H04L 67/125* (2013.01); *H04W 4/02* (2013.01); *H04W 4/30* (2018.02); *H04W 4/38* (2018.02)

(58) Field of Classification Search
    CPC ...... B25J 9/1689; H04L 67/10; H04L 67/125; H04W 4/30; H04W 4/02; H04W 4/33;
    (Continued)

(56) References Cited

U.S. PATENT DOCUMENTS 10,486,485 B1 *  11/2019  Levinson ........... B60G 17/0162
11,400,367 B1 *   8/2022  Ichapurapu .......... H04W 76/16
(Continued)

FOREIGN PATENT DOCUMENTS

JP    2017-017656 A    1/2017
JP    6097934 B2       3/2017
(Continued)

OTHER PUBLICATIONS

Office Action dated Aug. 23, 2022 issued in corresponding Japanese patent application No. 2021-538811.
(Continued)

*Primary Examiner* — Sohana Tanju Khayer
(74) *Attorney, Agent, or Firm* — Harness, Dickey & Pierce, P.L.C.

(57) ABSTRACT

An end device including a communication module configured to wirelessly communicate with an edge server managed by a cloud server, and at least one processor connected to the communication module, the at least one processor configured to receive a control command from the edge server through the communication module, and operate according to the control command.

20 Claims, 19 Drawing Sheets

(51) Int. Cl.
*H04L 67/125* (2022.01)
*H04W 4/02* (2018.01)
*H04W 4/30* (2018.01)
*H04W 4/38* (2018.01)

(58) Field of Classification Search
CPC ........... H04W 4/38; H04W 4/40; H04W 4/70; Y02D 30/70; G05D 1/00; G05D 1/0022
See application file for complete search history.

(56) References Cited

U.S. PATENT DOCUMENTS

| | | | |
|---|---|---|---|
| 2012/0303818 A1 | 11/2012 | Thibeault et al. | |
| 2015/0290808 A1 | 10/2015 | Renkis | |
| 2016/0066189 A1* | 3/2016 | Mahaffey | H04W 12/12 455/405 |
| 2016/0295379 A1* | 10/2016 | Jakatdar | H04L 67/10 |
| 2016/0337447 A1* | 11/2016 | Chakraborty | H04L 67/104 |
| 2017/0064066 A1* | 3/2017 | Das | H04W 4/023 |
| 2018/0040059 A1* | 2/2018 | Cruz | G06Q 30/0631 |
| 2018/0042031 A1* | 2/2018 | Hampel | H04W 72/04 |
| 2018/0068004 A1* | 3/2018 | Lavasani | G06F 16/28 |
| 2018/0068339 A1* | 3/2018 | Dey | G06Q 30/0269 |
| 2018/0077195 A1* | 3/2018 | Gathala | H04L 63/1433 |
| 2018/0150085 A1 | 5/2018 | Dey et al. | |
| 2018/0365785 A1* | 12/2018 | Boss | H04L 67/306 |
| 2019/0141509 A1* | 5/2019 | Copeland | H04W 4/02 |
| 2019/0268467 A1* | 8/2019 | Wang | H04W 76/14 |
| 2019/0271550 A1* | 9/2019 | Breed | G01C 21/3811 |
| 2019/0319868 A1* | 10/2019 | Svennebring | H04L 41/147 |
| 2019/0354360 A1* | 11/2019 | Chim | H04L 67/34 |
| 2020/0234609 A1* | 7/2020 | Murphy | G05D 1/0016 |
| 2020/0388382 A1* | 12/2020 | Costantino | G06F 21/44 |
| 2021/0068094 A1* | 3/2021 | Chen | H04W 74/006 |
| 2021/0181506 A1* | 6/2021 | Bao | H04N 21/6587 |
| 2021/0239851 A1* | 8/2021 | Gao | G01C 15/06 |
| 2022/0038535 A1* | 2/2022 | Kishida | G06F 16/2471 |

FOREIGN PATENT DOCUMENTS

| | | |
|---|---|---|
| JP | 2018-077599 A | 5/2018 |
| JP | 2018-148559 A | 9/2018 |
| KR | 101874351 B1 | 8/2018 |
| KR | 10-2018-0122816 A | 11/2018 |
| KR | 101926394 B1 | 12/2018 |
| WO | WO-201838131 A1 | 3/2018 |
| WO | WO-2018/112495 A2 | 6/2018 |
| WO | WO-2018-125989 A2 | 7/2018 |

OTHER PUBLICATIONS

Japanese Office Action dated Jan. 31, 2023 for corresponding Japanese patent application No. 2021-538811.
European search report issued on Jul. 12, 2022 by the EPO corresponding to European patent application No. 20736231.0.

* cited by examiner

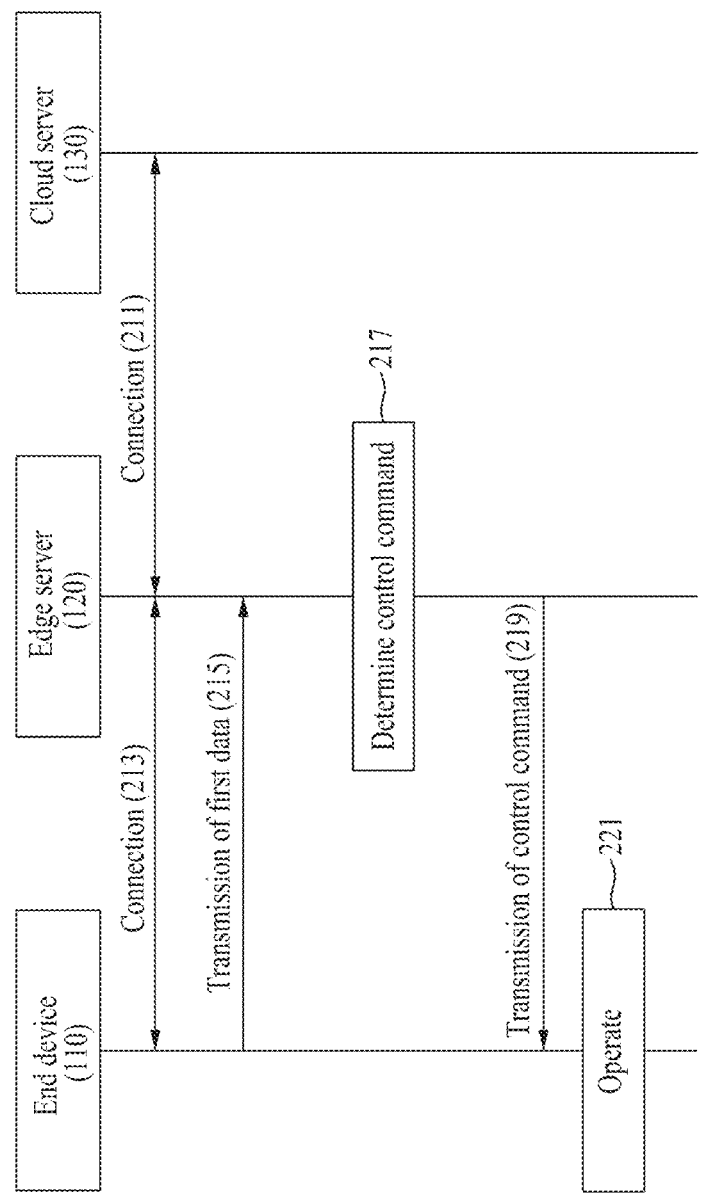

END DEVICE, THREE-PARTY COMMUNICATION SYSTEM COMPRISING CLOUD SERVER AND EDGE SERVER FOR CONTROLLING END DEVICE, AND OPERATION METHOD THEREFOR

CROSS-REFERENCE TO RELATED APPLICATIONS

This U.S. non-provisional application is a continuation application of, and claims the benefit of priority under 35 U.S.C. § 365(c) to, International Application No. PCT/KR2020/000077, filed on Jan. 3, 2020, which claims priority to Korean Patent Application No. 10-2019-0000546, filed on Jan. 3, 2019, Korean Patent Application No. 10-2019-0021200 filed on Feb. 22, 2019, and Korean Patent Application No. 10-2019-0174936, filed on Dec. 26, 2019, the entire contents of each of which are incorporated herein by reference in their entireties.

TECHNICAL FIELD

Various example embodiments relate to a communication system for three parties including an end device, an edge server for controlling the end device, and a cloud server, and an operation method thereof.

BACKGROUND

In general, an electronic device performs a complex function by adding various functions. With the advancement of technology, the electronic device is implemented as a robot and processes various types of tasks. The robot includes a driving module having a physical mechanism and a processor configured to control the driving module. The processor processes sensing data about a surrounding environment and determines a control command for the driving module. Through this, the driving module may operate according to the control command and the robot may process a task.

SUMMARY

A robot, as discussed above, independently operates and handles all the control operations by itself. Therefore, to secure the higher performance and higher precision operation of the robot, the performance of a processor is enhanced. As the performance of the processor is improved, manufacturing cost of the robot and power consumed by the robot also increase. In addition, the size of the processor is increased in order to increase the performance of the processor. Therefore, it is difficult to operate a small sized robot with higher performance and higher precision.

An end device according to various example embodiments may include a communication module configured to wirelessly communicate with an edge server managed by a cloud server, and at least one processor connected to the communication module, the at least one processor configured to receive a control command from the edge server through the communication module, and operate according to the control command.

An operation method of an end device according to various example embodiments may include wirelessly connecting to an edge server managed by a cloud server, wirelessly receiving a control command from the edge server, and operating according to the control command.

An edge server according to various example embodiments may include a communication module configured to communicate with a cloud server, the cloud server being is configured to manage the end device and the edge server, and at least one processor connected to the communication module the at least one processor configured to determine a control command for the end device, and wirelessly transmit the control command to the end device through the communication module.

An operation method of an edge server according to various example embodiments may include wirelessly connecting to the end device while maintaining a connection to a cloud server, the cloud server being configured to manage the edge server, determining a control command for the end device, and wirelessly transmitting the control command to the end device.

A cloud server according to various example embodiments may include a communication module configured to communicate with at least one edge server, the at least one edge server being configured to control at least one end device, and at least one processor connected to the communication module, the at least one processor configured to receive data from the edge server through the communication module, the data being related to the end device, and process the data.

An operation method of a cloud server according to various example embodiments may include connecting to at least one edge server configured to control at least one end device, receiving data related to the end device from the edge server, and processing the data.

A communication system according to various example embodiments may include at least one end device configured to collect data, at least one edge server configured to wirelessly control the at least one end device, and a cloud server configured to connect to the at least one edge server, and manage the at least one end device and the at least one edge server, wherein the at least one edge server is configured to wirelessly receive the data from the at least one end device, determine a control command based on the data, and wirelessly transmit the control command to the at least one end device, and the at least one end device is configured to wirelessly receive the control command from the at least one edge server, and operate according to the control command.

An operation method of a communication system according to various example embodiments may include wirelessly connecting, by an edge server, to at least one end device while the edge server is connected to a cloud server, collecting, by the at least one end device, data, wirelessly transmitting, by the at least one end device, the data to the edge server, determining, by the edge server, a control command based on the data, wirelessly transmitting, by the edge server, the control command to the at least one end device, and operating, by the at least one end device, according to the control command.

According to various example embodiments, an edge server may function as a brain of at least one end device to wirelessly control the end device. That is, since the edge server processes a control command for the end device, the end device only operates according to the control command. Therefore, the end device does not perform higher-level processing. Accordingly, the manufacturing cost of the end device may be saved and an amount of power consumed by the end device may be reduced. Regardless of a size of the end device, the end service may operate with higher performance and higher precision. In addition, the edge server may control a plurality of end devices based on the higher processing performance. Accordingly, in a communication system that includes the end device and the edge server, the efficiency of using resources including cost and power may be improved.

BRIEF DESCRIPTION OF DRAWINGS

FIG. 2A illustrates an operation method of a communication system according to various example embodiments.

DETAILED DESCRIPTION

Hereinafter, various example embodiments disclosed herein are described with reference to the accompanying drawings.

Figure 1A:
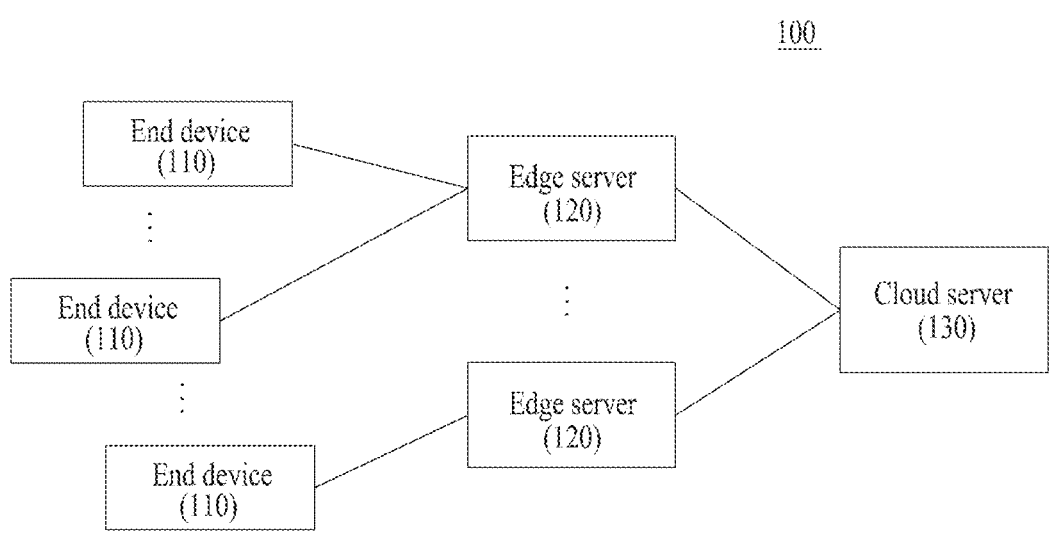
FIG. 1A illustrates a communication system according to various example embodiments.

FIG. 1A illustrates a communication system 100 according to various example embodiments.

Referring to FIG. 1A, the communication system 100 according to various example embodiments may refer to a three-party communication system, and may include at least one end device 110, at least one edge server 120, and/or a cloud server 130.

The end device 110 may refer to an electronic device and may include a robot (e.g., a drone, etc.). The edge server 120 may refer to an electronic device and may function as a brain of (e.g., to perform processing and/or control of) the end device 110. That is, each edge server 120 may wirelessly control the at least one end device 110. According to various example embodiments, the edge server 120 may control the end device 110 based on a set control period. The control period may be determined based on a sum of an amount of time given to process data related to the end device 110 and an amount of time given to provide a control command to the end device 110. The cloud server 130 may manage at least one of the end device 110 and/or the edge server 120. According to various example embodiments, the edge server 120 may function as a server for the end device 110 and may function as a client for the cloud server 130. According to various example embodiments, the edge server 120 and/or the cloud server 130 may include a processor (e.g., a processor 630 and/or a processor 830, as discussed further below) that may be physically larger, consume greater resources, and/or be capable of capable of higher performance (e.g., throughput, quantity of computations, complexity of computations, etc.) and/or higher precision (e.g., more precise computations), than a processor included in the end device 110 (e.g., a processor 360, as discussed further below).

The end device 110 and the edge server 120 may communicate in a wireless manner. The edge server 120 and the cloud server 130 may communicate in a wired or wireless manner. According to various example embodiments, the end device 110 and the edge server 120 may communicate through a wireless network that enables ultra-reliable and low latency communications (URLLC). The wireless network may have features capable of performing enhanced mobile broadband (eMBB) and massive machine type communications (mMTC) as well as URLLC. According to various example embodiments, the wireless network may include at least one of a first wireless network and/or a second wireless network. The first wireless network may include a long-distance wireless network, for example, a 5G network, and the second wireless network may include a short-range wireless network, for example, wireless fidelity (WiFi)-6 (WiFi ad/ay). For example, the edge server 120 may include a mobile edge computing, or multi-access edge computing, (MEC) server and may be installed in a base station. Through this, latency caused by communication between the end device 110 and the edge server 120 may be reduced. According to various example embodiments, according to a decrease in an amount of time given to provide a control command to the end device 110, an amount of time given to process data may increase in a control period of the edge server 120. The edge server 120 and the cloud server 130 may communicate through a wireless network, for example, the Internet.

In various example embodiments, a plurality of edge servers 120 may be connected over a wireless mesh network and a function of the cloud server 130 may be distributed to the edge servers 120. In this case, with respect to a specific end device 110, one of the edge servers 120 may function as the edge server 120 for the end device 110, and at least another one of the edge servers 120 may function as the cloud server 130 for the end device 110 in cooperation with one of the edge servers 120.

Figure 1B:
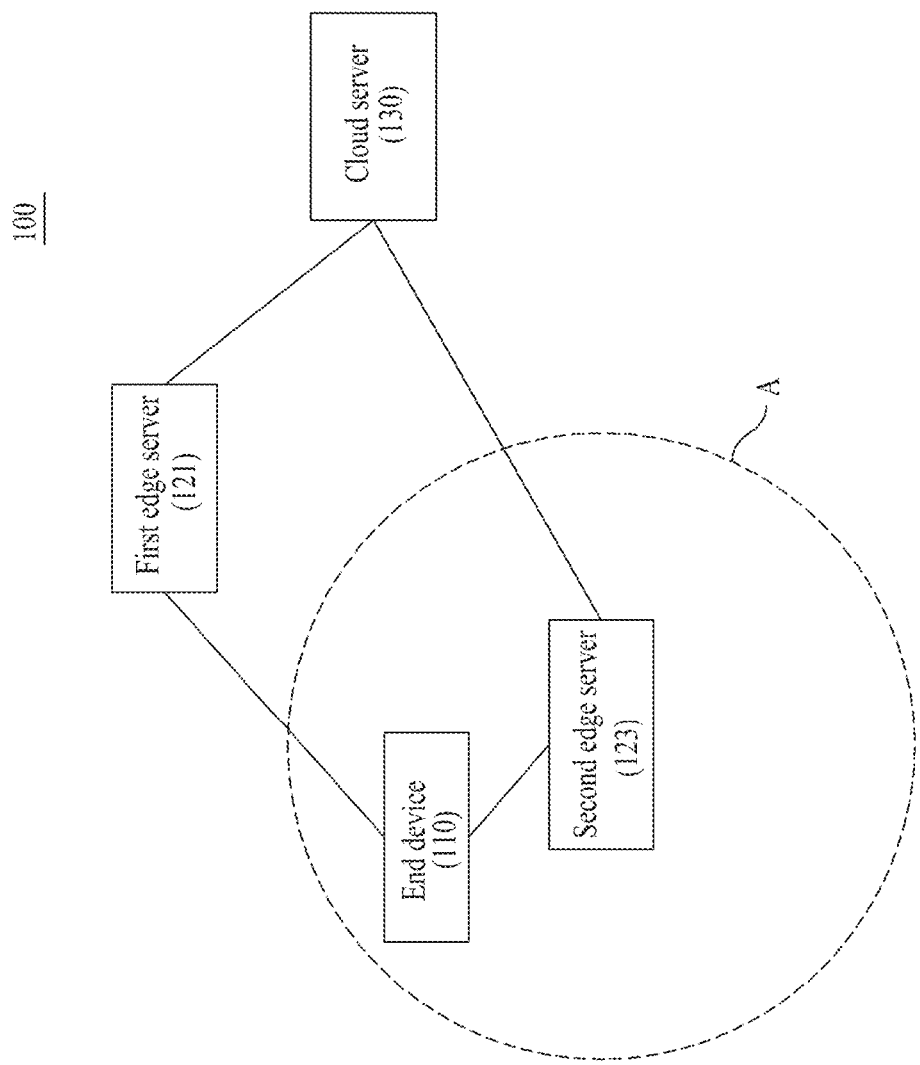
FIG. 1B illustrates a communication system according to various example embodiments.

FIG. 1B illustrates the communication system 100 according to various example embodiments.

Referring to FIG. 1B, the edge server 120 may include a first edge server 121 and a second edge server 123. According to various example embodiments, each of the first edge server 121 and the second edge server 123 may communicate with the cloud server 130. Each end device 110 may wirelessly communicate with at least one of the first edge server 121 and/or the second edge server 123. The first edge server 121 may communicate with the end device 110 through the first wireless network, for example, a 5G network. The second edge server 123 may communicate with the end device 110 through the second wireless network, for example, WiFi-6 (WiFi ad/ay). According to various example embodiments, the end device 110 may communicate with the first edge server 121 outside communication coverage A (e.g., when the end device 110 is outside the communication coverage A) of the second edge server 123. The end device 110 may communicate with at least one of the first edge server 121 and the second edge server 123 within the communication coverage A (e.g., when the end device 110 is inside the communication coverage A) of the second edge server 123.

The communication system 100 for three parties according to various example embodiments may include at least one end device 110 configured to collect data, at least one edge server 120 configured to wirelessly control the end device 110, and/or the cloud server 130 configured to connect to the edge server 120, and manage the end device 110 and the edge server 120.

According to various example embodiments, the edge server 120 may be configured to wirelessly receive data from the end device 110, determine a control command based on the data, and transmit the control command to the end device 110.

According to various example embodiments, the edge server 120 may include the first edge server 121 of the first wireless network and the second edge server 123 of the second wireless network.

For example, the first wireless network may be a long-distance wireless network and the second wireless network may be a short-range wireless network.

According to various example embodiments, the end device 110 may be configured to wirelessly receive the control command from the edge server 120 and operate according to the control command.

According to various example embodiments, the end device 110 may be configured to transmit data to one of the first edge server 121 and/or the second edge server, and wirelessly receive the control command from one of the first edge server 121 and/or the second edge server 123.

According to various example embodiments, the edge server 120 may be configured to determine whether to cooperate with the cloud server 130 based on data and, when the edge server 120 determines to not cooperate with the cloud server 130, determine the control command and transmit the control command within a set control period.

According to various example embodiments, when the edge server 120 determines to cooperate with the cloud server 130, the edge server 120 may be configured to determine the control command through communication with the cloud server 130 based on data.

According to various example embodiments, the first edge server 121 may be configured to determine the control command based on data and transmit the control command to the end device 110 through the first wireless network.

According to various example embodiments, the second edge server 123 may be configured to determine whether to cooperate with the cloud server 130 based on data and, when the edge server 120 determines to not cooperate with the cloud server 130, determine the control command and transmit the control command to the end device 110 through the second wireless network within a set control period.

According to various example embodiments, when the edge server 120 determines to cooperate with the cloud server 130, the second edge server 123 may be configured determine the control command through communication with the cloud server 130 based on data and transmit the control command to the end device 110 through the second wireless network.

FIG. 2A illustrates an operation method of the communication system 100 according to various example embodiments.

Referring to FIG. 2A, the edge server 120 may be connected to the cloud server 130 in operation 211 and may be connected to the end device 110 in operation 213. The edge server 120 may be connected to the end device 110 during connection to (e.g., while edge server 120 is also connected to) the cloud server 130. According to various example embodiments, the edge server 120 may be connected to the cloud server 130 in a wired or wireless manner, and may be connected to the end device 110 in a wireless manner. According to various example embodiments, the edge server 120 may be connected to the end device 110 through a wireless network that enables URLLC.

In operation 215, the end device 110 may transmit first data to the edge server 120. To this end, the end device 110 may collect the first data. The first data may include at least one of sensing data about an external environment of the end device 110, state data about the end device 110, and/or a request corresponding to an operation of the end device 110. According to various example embodiments, the sensing data may include localization data that represents a distance between the end device 110 and a base station, for example, a WiFi access point (AP), and may be used to estimate a position of the end device 110.

In operation 217, the edge server 120 may determine a control command for the end device 110. According to various example embodiments, the edge server 120 may determine the control command based on the first data. The control command may be for controlling a motion of the end device 110. In operation 219, the edge server 120 may transmit the control command to the end device 110. According to various example embodiments, the edge server 120 may determine the control command based on the first data and may transmit the control command within a set control period. The control period may be determined as a sum of an amount of time used to determine the control command based on the first data and an amount of time used to transmit the control command to the end device 110. For example, the set control period may be 5 ms, and the edge server 120 may determine the control command based on the first data for 4 ms and may transmit the control command to the end device 110 for 1 ms. According to various example embodiments, the edge server 120 may transmit the control command with map information related to the end device 110.

In operation 221, the end device 110 may operate according to the control command. For example, the end device 110 may move its position, or change its posture, by changing its motion.

Figure 2B:
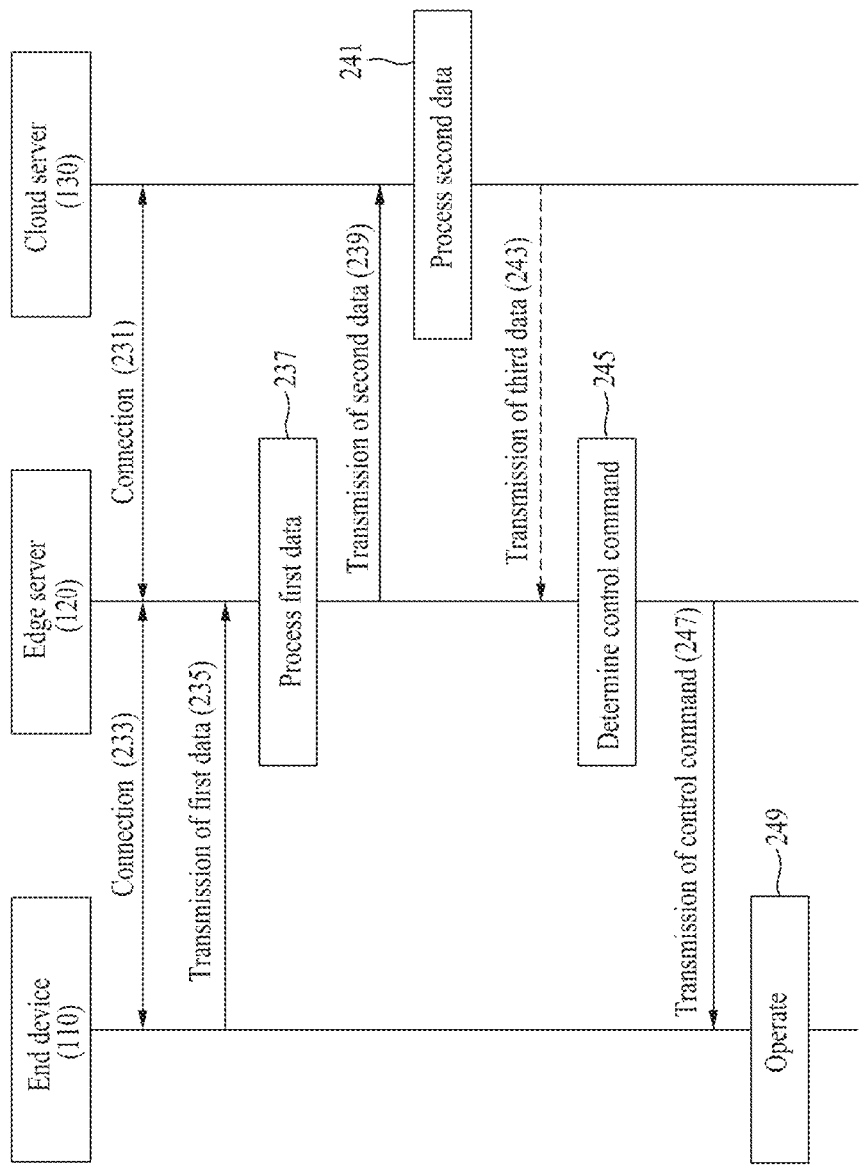
FIG. 2B illustrates an operation method of a communication system according to various example embodiments.

FIG. 2B illustrates an operation method of the communication system 100 according to various example embodiments.

Referring to FIG. 2B, the edge server 120 may be connected to the cloud server 130 in operation 231 and may be connected to the end device 110 in operation 233. The edge server 120 may be connected to the end device 110 during connection to (e.g., while edge server 120 is also connected to) the cloud server 130. According to various example embodiments, the edge server 120 may be connected to the cloud server 130 in a wired or wireless manner, and may be connected to the end device 110 in a wireless manner. According to various example embodiments, the edge server 120 may be connected to the end device 110 through a wireless network that enables URLLC.

In operation 235, the end device 110 may transmit first data to the edge server 120. To this end, the end device 110 may collect the first data. The first data may include at least one of sensing data about an external environment of the end device 110, state data about the end device 110, and/or a request corresponding to an operation of the end device 110. According to various example embodiments, the sensing data may include localization data that represents a distance between the end device 110 and a base station, for example, a WiFi AP, and may be used to estimate a position of the end device 110.

In operation 237, the edge server 120 may process the first data received from the end device 110. According to various example embodiments, the edge server 120 may detect second data based on the first data. The second data may include at least one of a process result of the first data and/or a request (query) for the end device 110. In operation 239, the edge server 120 may transmit the second data to the cloud server 130.

In operation 241, the cloud server 130 may process the second data received from the edge server 120. According to various example embodiments, the cloud server 130 may detect third data based on the second data. The third data may include at least one of a processing result of the second data and/or a response for (e.g., to) the request for the end device 110. According to various example embodiments, the cloud server 130 may detect the third data from the second data using a machine learning model. Additionally, the cloud server 130 may update the machine learning model by performing machine learning using the second data. According to various example embodiments, in operation 243, the cloud server 130 may transmit the third data to the edge server 120.

In operation 245, the edge server 120 may determine a control command for the end device 110. According to various example embodiments, the edge server 120 may determine the control command based on at least one of the first data and/or the third data. According to various example embodiments, the edge server 120 may determine the control command based on the third data received from the cloud server 130. The control command may be for controlling a motion of the end device 110 or may be for performing a software update. According to various example embodiments, the edge server 120 may process the second data. According to various example embodiments, the edge server 120 may detect the third data based on the second data and may determine the control command based on the third data. According to various example embodiments, the edge server 120 may detect the third data from the second data using the machine learning model. Additionally, the edge server 120 may update the machine learning model by performing machine learning using the second data. The control command may be for controlling a motion of the end device 110. In operation 247, the edge server 120 may transmit the control command to the end device 110. According to various example embodiments, the edge server 120 may transmit the control command with map information related to the end device 110.

In operation 249, the end device 110 may operate according to the control command. For example, the end device 110 may move its position, change its posture by changing its motion, and/or may perform software update.

An operation method of the communication system 100 for three parties according to various example embodiments may include wirelessly connecting, by the edge server 120, to at least one end device 110 while the edge server 120 is connected to the cloud server 130; collecting, by the end device 110, data; wirelessly transmitting, by the end device 110, the data to the edge server 120; determining, by the edge server 120, a control command based on the data; wirelessly transmitting, by the edge server 120, the control command to the end device 110; and operating, by the end device 110, according to the control command.

According to various example embodiments, the edge server 120 may include the first edge server 121 of the first wireless network and the second edge server 123 of the second wireless network.

For example, the first wireless network may be a long-distance wireless network, and the second wireless network may be a short-range wireless network.

According to various example embodiments, the operating method of the communication system 100 for three parties may further include receiving, by the first edge server 121, data from the end device 110; determining, by the first edge server 121, a control command based on the data; and transmitting, by the first edge server 121, the control command to the end device 110 through the first wireless network.

According to various example embodiments, the operating method of the communication system 100 for three parties may further include receiving, by the second edge server 123, data from the end device 110; determining, by the second edge server 123, whether to cooperate with the cloud server 130 based on the data; when it is determined to not cooperate with the cloud server 130, determining, by the second edge server 123, a control command within a set control period; and transmitting, by the second edge server 123, the control command to the end device 110 through the second wireless network.

According to various example embodiments, the operation method of the communication system 100 for three parties may further include, when it is determined to cooperate with the cloud server 130, determining, by the second edge server 123, a control command through communication with the cloud server 130 based on the data; and transmitting, by the second edge server 123, the control command to the end device 110 through the second wireless network.

Figure 3A:
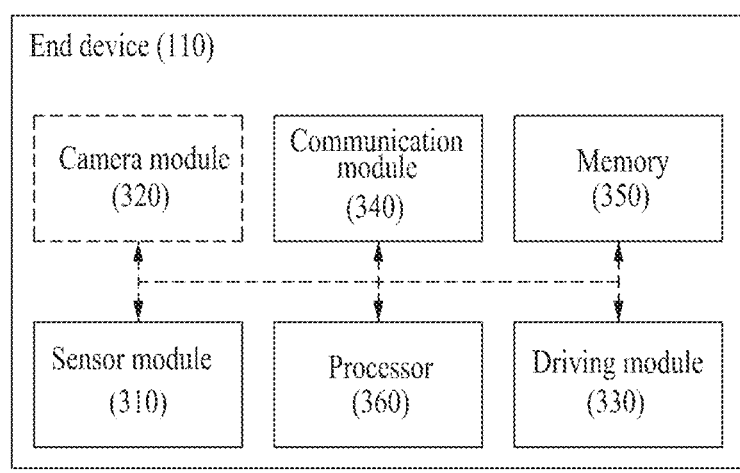
FIG. 3A is a diagram illustrating an end device according to various example embodiments.
Figure 3B:
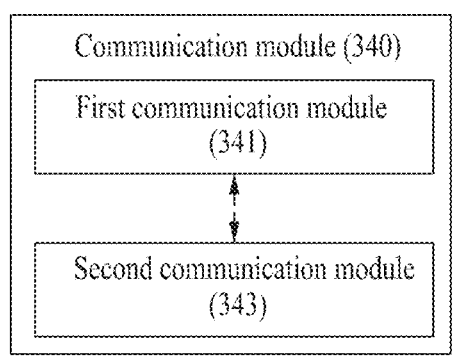
FIG. 3B is a diagram illustrating a communication module of FIG. 3A according to various example embodiments.
Figure 3C:
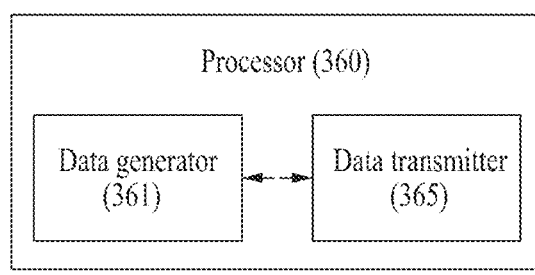
FIG. 3C is a diagram illustrating a processor of FIG. 3A according to various example embodiments.
Figure 3D:
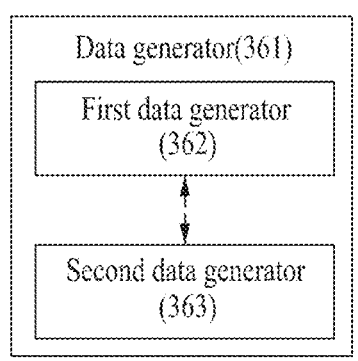
FIG. 3D is a diagram illustrating a data generator of FIG. 3C according to various example embodiments.

FIG. 3A is a diagram illustrating the end device 110 according to various example embodiments. FIG. 3B is a diagram illustrating a communication module 340 of FIG. 3A according to various example embodiments. FIG. 3C is a diagram illustrating a processor 360 of FIG. 3A according to various example embodiments. FIG. 3D is a diagram illustrating a data generator 361 of FIG. 3C according to various example embodiments.

Referring to FIG. 3A, the end device 110 according to various example embodiments may refer to an electronic device and may include at least one of a sensor module 310 (also referred to as a "sensing module" herein), a camera module 320, a driving module 330, a communication module 340, a memory 350, and/or a processor 360. In various example embodiments, at least one of components of the end device 110, for example, the camera module 320 may be omitted and at least one other component may be added. In various example embodiments, at least two of the components of the end device 110 may be implemented as a single integrated circuit. According to various example embodiments, the end device 110 may be a robot.

The sensor module 310 may sense an external environment state of the end device 110 and may generate sensing data corresponding thereto. For example, the sensor module 310 may include a distance sensor, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illumination sensor. For example, the distance sensor may include at least one of a sonar sensor, a time of flight (ToF) sensor, a laser range finder (LRF) sensor, and/or an inertial measurement unit (IMU) sensor.

The camera module 320 may capture an image (e.g., discrete images, video, etc.). For example, the camera module 320 may include at least one of at least one lens, an image sensor, an image signal processor, and/or a flash.

The driving module 330 may implement a physical operation, that is, a motion of the end device 110. According to various example embodiments, the driving module 330 may move a position, or change a posture, of the end device 110. For example, the driving module 330 may include at least one of a wheel mechanism, a joint mechanism, and/or an actuator. The actuator refers to a mechanism for controlling a position, a speed, and/or a force of the wheel mechanism, or the joint mechanism, and may include, for example, a motor and/or an encoder. According to various example embodiments, the driving module 330 may output information. For example, the driving module 330 may include at least one of a display module and/or an audio output module.

The communication module 340 may support wireless communication with an external device in the end device 110 (e.g., wireless communication between the end device 110 and the external device). According to various example embodiments, the communication module 340 may support establishing a wireless communication channel with the external device based on a predefined or alternatively, given communication method, and performing communication through the communication channel. According to various example embodiments, the communication module 340 may communicate with the edge server 120 through a wireless network that enables URLLC. The wireless network may include at least one of a first wireless network, for example, a 5G network, and a second wireless network, WiFi-6 (WiFi ad/ay). The communication module 340 may verify and authenticate the end device 110 based on stored identification information.

According to various example embodiments, referring to FIG. 3B, the communication module 340 may include a first communication module 341 and/or a second communication module 343. The first communication module 341 may communicate with the first edge server 121 through the first wireless network, for example, a 5G network. The second communication module 343 may communicate with the second edge server 123 through the second wireless network, for example, WiFi-6 (WiFi ad/ay). According to various example embodiments, the communication module 340, the first communication module 341 and/or the second communication module 343 may each be implemented using, for example, an radio frequency (RF) chain, an encoder, a modulator, a decoder, a demodulator, a filter, etc.

The memory 350 may store data used by at least one of the components of the end device 110 (e.g., the sensor module 310, the camera module 320, the driving module 330, the communication module 340, and/or the processor 360). The data may include a program, and input data or output data related thereto. For example, the memory 350 may store parameters and dynamic model information about a motion of the end device 110. The memory 350 may include a volatile memory and/or a non-volatile memory. The program may be stored in the memory 350 as software and may include an operating system (OS) to control resources of the end device 110.

The processor 360 may control the overall operation of the end device 110. The processor 360 may communicate with the edge server 120 through the communication module 340. According to various example embodiments, the processor 360 may transmit collected first data to the edge server 120. The first data may include at least one of sensing data about an external environment of the end device 110, state data about the end device 110, and/or a request corresponding to an operation of the end device 110. According to various example embodiments, the sensing data may include localization data that represents a distance between the end device 110 and a base station, for example, a WiFi AP, and may be used to estimate a position of the end device 110. The processor 360 may operate according to the control command received from the edge server 120. According to the control command, the processor 360 may operate the driving module 330. Alternatively or additionally, according to the control command, the processor 360 may update software of the memory 350.

According to various example embodiments, referring to FIG. 3C, the processor 360 may include a data generator 361 and/or a data transmitter 365. The data generator 361 may generate first data. The data transmitter 365 may transmit the first data to the edge server 120. According to various example embodiments, the data transmitter 365 may transmit the first data to the edge server 120 through the communication module 340. According to various example embodiments, the data transmitter 365 may perform transmission scheduling for the first data.

According to various example embodiments, the data generator 361 may generate first data and may classify the first data. The data generator 361 may classify the first data based on at least one of the first data and/or a control command to be received from the edge server 120 in response to the first data. According to various example embodiments, the data generator 361 may classify the first data depending on a priority between lower latency transmission, and large capacity transmission, for at least one of the first data and/or the control command. When the lower latency transmission is prioritized for at least one of the first data and/or the control command, the data generator 361 may classify the first data into a first type. When the large capacity transmission is prioritized for at least one of the first data and/or the control command, the data generator 361 may classify the first data into a second type. For example, when the first data includes localization data or when the control command is to be received with map information in response to the first data, the data generator 361 may classify the first data into the second type. Otherwise, the data generator 361 may classify the first data into the first type. Through this, the data transmitter 365 may transmit the first type of the first data to the first edge server 121 through the first communication module 341. Alternatively, the data transmitter 365 may transmit the second type of first data to the second edge server 123 through the second communication module 343. When both the first type of the first data and the second type of the first data are present, the data transmitter 365 may determine transmission priority for the first type of the first data and the second type of the first data, and may perform transmission scheduling based on the determined transmission priority.

Referring to FIG. 3D, according to various example embodiments, the data generator 361 may include a first data generator 362 and/or a second data generator 363. The first data generator 362 may generate the first type of the first data. According to various example embodiments, when the lower latency transmission is prioritized for at least one of the first data to be generated and/or a control command to be received at the edge server 120 in response to the first data to be generated, the first data generator 362 may generate the corresponding first data. The second data generator 363 may generate the second type of the first data. According to various example embodiments, when the large capacity transmission is prioritized for at least one of the first data to be generated and/or the control command to be received at the edge server 120 in response to the first data to be generated, the second data generator 363 may generate the corresponding first data. Through this, the data transmitter 365 may transmit the first type of the first data to the first edge server 121 through the first communication module 341. Alternatively, the data transmitter 365 may transmit the second type of the first data to the second edge server 123 through the second communication module 343. According to various example embodiments, when both the first type of the first data and the second type of the first data are present, the data transmitter 365 may determine transmission priority for the first type of the first data and the second type of the first data, and may perform transmission scheduling based on the determined transmission priority.

The end device 110 according to various example embodiments may include the communication module 340 configured to wirelessly communicate with the edge server 120 managed by the cloud server 130 and the processor 360 configured to connect to the communication module 340.

According to various example embodiments, the edge server 120 may include the first edge server 121 of the first wireless network and/or the second edge server 123 of the second wireless network.

For example, the first wireless network may be a long-distance wireless network and the second wireless network may be a short-range wireless network.

According to various example embodiments, the processor 360 may be configured to receive a control command from the edge server 120 through the communication module 340 and operate according to the control command.

According to various example embodiments, the end device 110 may further include the driving module 330 configured to perform a physical operation.

According to various example embodiments, the processor 360 may operate the driving module 330 in response to the control command.

According to various example embodiments, the end device 110 may further include the sensing module 310 configured to collect data.

According to various example embodiments, the processor 360 may be configured to transmit data to the edge server 120 through the communication module 340.

According to various example embodiments, the processor 360 may be configured to generate data, transmit the data to one of the first edge server 121 and/or the second edge server 123 through the communication module 340, and receive the control command from one of the first edge server 121 and/or the second edge server 123 through the communication module 340.

For example, the processor 360 may be configured to determine which one (e.g., among the first edge server 121 or the second edge server 122) is suitable for transmitting data between the first wireless network and the second wireless network based on at least one of a type of the data, a resource used to transmit the data, and/or a resource corresponding to a control command to be received in response to the data.

For example, the processor 360 may include the data generator 361 configured to generate data, and classify the data into a first type corresponding to the first wireless network or a second type corresponding to the second wireless network, and the data transmitter 365 configured to transmit the first type of the data to the first edge server 121 through the first wireless network and transmit the second type of the data to the second edge server 123 through the second wireless network.

As another example, the processor 360 may include the first data generator 362 configured to generate the first type of the data corresponding to the first wireless network, the second data generator 363 configured to generate the second type of the data corresponding to the second wireless network, and the data transmitter 365 configured to transmit the first type of the data to the first edge server 121 through the first wireless network and transmit the second type of the data to the second edge server 123 through the second wireless network.

According to various example embodiments, the processor 360 may be configured to detect a failure of a wireless connection state with the edge server 120 through the communication module 340 and suspend an operation.

According to various example embodiments, the processor 360 may be configured to detect resolution of the failure through the communication module 340 and wait to receive the control command through the communication module 340.

According to various example embodiments, the processor 360 may be configured to perform a software update according to the control command.

Figure 4:
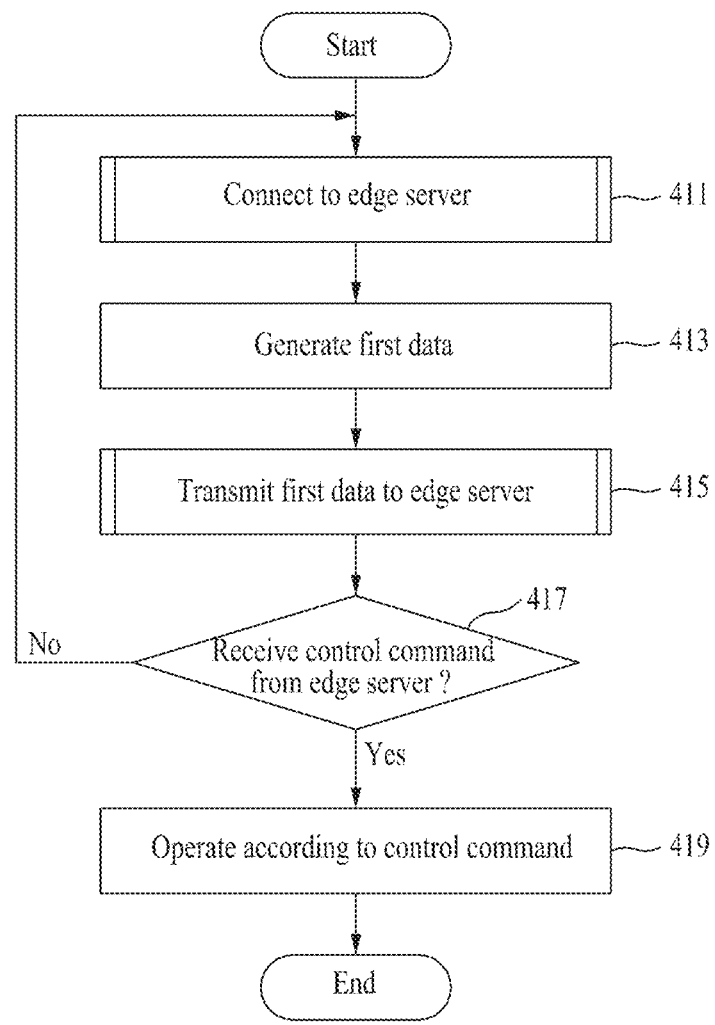
FIG. 4 is a flowchart illustrating an operation method of an end device according to various example embodiments.

FIG. 4 is a flowchart illustrating an operation method of the end device 110 according to various example embodiments.

Referring to FIG. 4, in operation 411, the end device 110 may be connected to the edge server 120. The processor 360 may be connected to the edge server 120 through the communication module 340. According to various example embodiments, the communication module 340 may be connected to the edge server 120 through a wireless network that enables URLLC. The wireless network may include at least one of a first wireless network and/or a second wireless network. The first wireless network may include a long-distance wireless network, for example, a 5G network, and the second wireless network may include a short-range wireless network, for example, a WiFi-6 (WiFi ad/ay).

According to various example embodiments, the edge server 120 may include the first edge server 121 of the first wireless network and the second edge server 123 of the second wireless network. The communication module 340 of the end device 110 may include the first communication module 341 configured to communicate using the first wireless network and the second communication module 343 configured to communicate using the second wireless network. In this case, the end device 110 may be connected to the first edge server 121 outside (e.g., when the end device 110 is outside) the communication coverage A of the second edge server 123. According to various example embodiments, the processor 360 may be connected to the first edge server 121 through the first communication module 341. The end device 110 may be connected to each of the first edge server 121 and the second edge server 123 inside (e.g., when the end device 110 is inside) the communication coverage A of the second edge server 123. According to various example embodiments, the processor 360 may be connected to the first edge server 121 through the first communication module 341 and may be connected to the second edge server 123 through the second communication module 343.

In operation 413, the end device 110 may generate first data. The first data may include at least one of sensing data about an external environment of the end device 110, state data about the end device 110, and/or a request corresponding to an operation of the end device 110. According to various example embodiments, the sensing data may include localization data that represents a distance between the end device 110 and a base station, for example, a WiFi AP, and may be used to estimate a position of the end device 110. The processor 360 may collect the sensing data through the sensing module 310 or the camera module 320. For example, the state data may include at least one of identification information of the end device 110, battery (not shown) state information, and/or state information (e.g., idle or working) of the driving module 330. The processor 360 may collect the localization data using the communication module 340. For example, the processor 360 may calculate a distance between the end device 110 and the base station based on signal strength received from the base station. According to various example embodiments, the processor 360 may mosaic or blur an area related to a person from an image captured through the camera module 320, and may generate the same (e.g., generate an updated version of the captured image in which the area related to the person mosaicked or blurred) as the first data.

In operation 415, the end device 110 may transmit the first data to the edge server 120. The processor 360 may transmit the first data to the edge server 120 through the communication module 340. According to various example embodiments, the processor 360 may transmit the first data to the edge server 120 through the first wireless network, for example, a 5G network, or the second wireless network, for example, WiFi-6 (WiFi ad/ay).

According to various example embodiments, the processor 360 may transmit the first data to one of the first edge server 121 and/or the second edge server 123. To this end, the processor 360 may determine whether to transmit the first data to the first edge server 121, or whether to transmit the first data to the second edge server 123, based on the first data. For example, the processor 360 may determine which one (e.g., which among the first edge server 121 and the second edge server 123) is suitable for transmitting the first data between the first wireless network and the second wireless network based on at least one of a data type of the first data, a resource used transmit the first data, and/or a resource corresponding to a control command to be received in response to the first data. Through this, the processor 360 may transmit the first data to the first edge server 121 through the first wireless network, or may transmit the first data to the second edge server 123 through the second wireless network. Further description related thereto is made with reference to FIGS. 5B and 5C.

In operation 417, the end device 110 may determine whether the control command has been received from the edge server 120. If the control command has not been received from the edge server 120 in operation 417, the processor 360 may repeat operations 411, 413, 415 and 417. Alternatively, if the control command has been received from the edge server 120 in operation 417, the processor may perform an operation according to the received control command (operation 419). The processor 360 may receive the control command from the edge server 120 through the communication module 340. According to various example embodiments, the processor 360 may receive the control command from the edge server 120 through the first wireless network, for example, a 5G network, or through the second wireless network, for example, WiFi-6 (WiFi ad/ay). According to various example embodiments, the processor 360 may receive the control command with map information related to the end device 110.

According to various example embodiments, the processor 360 may receive the control command from one of the first edge server 121 and/or the second edge server 123. According to various example embodiments, when the first data is transmitted to the first edge server 121, the processor 360 may receive the control command from the first edge server 121. Alternatively, when the first data is transmitted to the second edge server 123, the processor 360 may receive the control command from the second edge server 123.

In operation 419, the end device 110 may operate according to the control command. The processor 360 may control at least one of components of the end device 110 according to the control command.

According to various example embodiments, the processor 360 may operate the driving module 330 according to the control command. For example, the control command may include at least one of position coordinates, and/or a speed value, of at least one of a travel route and/or a target position of the end device 110. When the control command includes the position coordinates, the processor 360 may operate the driving module 330 to move the end device 110 based on the position coordinates of the control command. When the control command includes the speed value, the processor 360 may operate the driving module 330 to move the end device 110 based on the speed value of the control command. As another example, the control command may include manipulation variables for processing a task using the end device 110. The processor 360 may control a joint mechanism based on manipulation variables by operating the driving module 330 and may control the end device 110 to process a task. According to various example embodiments, the processor 360 may control an operation based on sensing data collected through the sensor module 310 or the camera module 320 while operating the driving module 330. For example, when an obstacle in the travel route of the end device 110 is detected from the sensing data, the processor 360 may detour the obstacle and move the end device 110.

According to various example embodiments, the processor 360 may perform a software update according to the control command. For example, when the control command includes update information, the processor 360 may update software of (e.g., stored in) the memory 350 based on the update information.

Figure 5A:
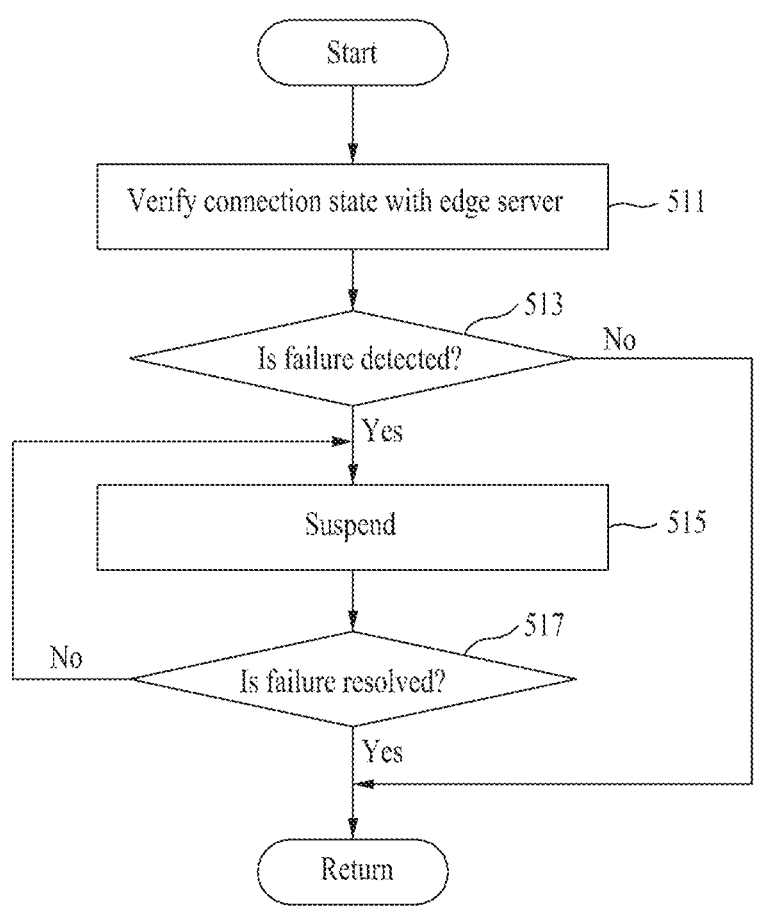
FIG. 5A is a flowchart illustrating an operation of connecting to an edge server of FIG. 4 according to various example embodiments.

FIG. 5A is a flowchart illustrating an operation of connecting to the edge server 120 of FIG. 4. FIG. 5A may represent various example embodiments of operation 411 of FIG. 4.

Referring to FIG. 5A, in operation 511, the end device 110 may verify a connection state with the edge server 120. According to various example embodiments, when the communication module 340 is connected to the edge server 120 through a wireless network, the processor 360 may continuously monitor the connection state with the edge server 120 through the communication module 340. For example, the processor 360 may detect at least one of whether a reference signal transmitted from the edge server 120 is received and/or a reception strength of the reference signal.

In operation 513, the end device 110 may determine whether a failure is detected from the connection state with the edge server 120. For example, if the reference signal transmitted from the edge server 120 is not received, or if the reception strength is less than a set threshold, the processor 360 may detect a failure.

When the failure is not detected in operation 513, the end device 110 may return to FIG. 4 and perform operation 413. For example, when the failure is resolved within a set period of time, although the failure is detected in operation 513, the processor 360 may ignore the failure. If the processor 360 is operating according to a control command received in advance, the processor 360 may ignore the failure and may continuously operate.

On the contrary, when the failure is detected in operation 513, the end device 110 may be suspended in operation 515. For example, if the failure continues for a preset or alternatively, given period of time from a point in time at which the failure is detected (e.g., initially detected), the processor 360 may determine that the failure is detected (e.g., has occurred). Through this, if the processor 360 is operating according to the control command received in advance, the processor 360 may suspend an operation. In operation 517, the end device 110 may determine whether the failure is resolved. According to various example embodiments, while suspending the operation, the processor 360 may continuously monitor the connection state with the edge server 120 through the communication module 340. For example, if the reference signal transmitted from the edge server 120 is not received, or if the reception strength is greater than or equal to a set threshold, the processor 360 may determine that the failure is resolved. When the failure is not resolved in operation 517, the end device 110 may return to, or continue to perform, operation 515 and may be continuously suspended.

On the contrary, when the failure is resolved in operation 517, the end device 110 may return to operation 413 of FIG. 4.

According to various example embodiments, the edge server 120 may include the first edge server 121 of the first wireless network and the second edge server 123 of the second wireless network. The communication module 340 of the end device 110 may include the first communication module 341 configured to communicate using the first wireless network and the second communication module 343 configured to communicate using the second wireless network. In this case, the processor 360 may monitor connection states with both the first edge server 121 and the second edge server 123. According to various example embodiments, the processor 360 may monitor the connection state with the first edge server 121 through the first communication module 341 and may monitor the connection state with the second edge server 123 through the second communication module 343. Through this, the processor 360 may be connected to at least one of the first edge server 121 and/or the second edge server 123.

Figure 5B:
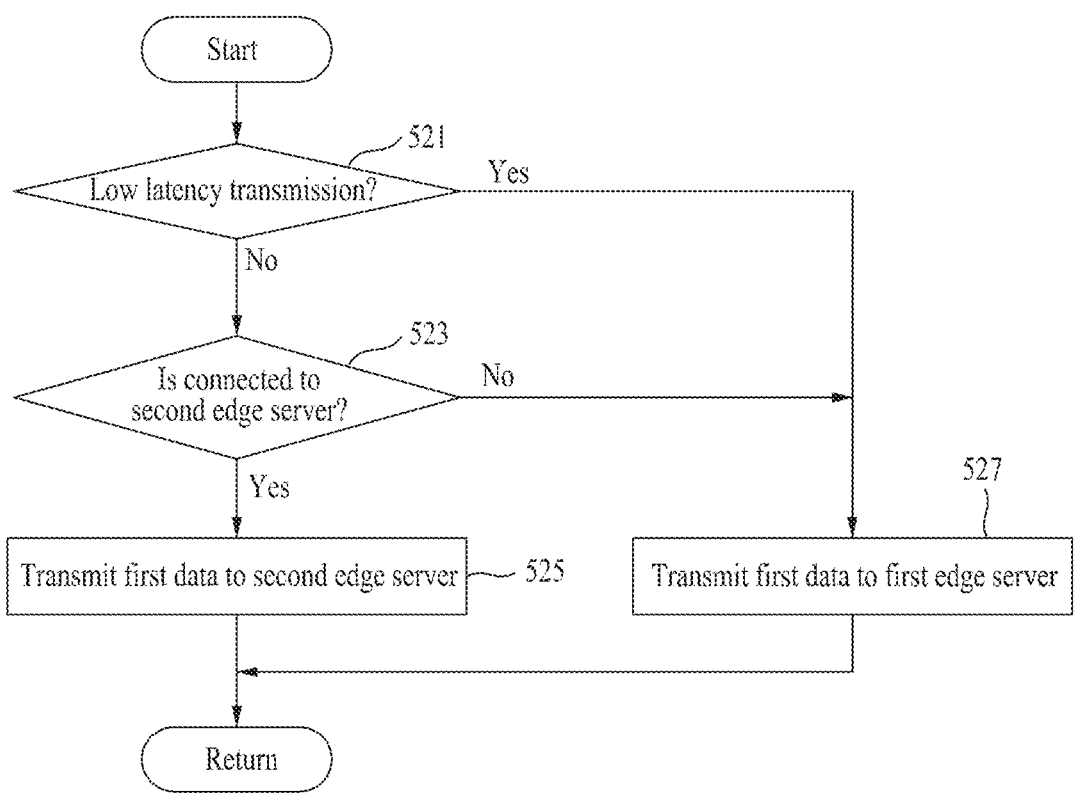
FIGS. 5B and 5C are flowcharts illustrating an operation of transmitting first data to an edge server of FIG. 4 according to various example embodiments.

FIG. 5B is a flowchart illustrating an example of an operation of transmitting first data to the edge server 120 of FIG. 4 according to various example embodiments. FIG. 5B may represent various example embodiments of operation 415 of FIG. 4. According to various example embodiments, the edge server 120 may include the first edge server 121 of the first wireless network and the second edge server 123 of the second wireless network. The communication module 340 of the end device 110 may include the first communication module 341 configured to communicate using the first wireless network and the second communication module 343 configured to communicate using the second wireless network.

Referring to FIG. 5B, in operation 521, the end device 110 may determine whether lower latency transmission is prioritized for first data. The processor 360 may determine whether lower latency transmission is prioritized or whether large capacity transmission rather than the lower latency transmission is prioritized for the first data, based on at least one of the first data and/or a control command to be received from the edge server 120 in response to the first data. For example, the processor 360 may determine whether the lower latency transmission is prioritized or whether the large capacity transmission is prioritized for the first data based on a data type of the first data, a resource used to transmit the first data, and/or the like. For example, when the first data includes localization data or when the control command to be received in response to the first data is to be received with map information, the processor 360 may determine that the large capacity transmission is prioritized for the first data. Otherwise, the processor 360 may determine that the lower latency transmission is prioritized for the first data.

When it is determined that the lower latency transmission is prioritized for the first data in operation 521, the end device 110 may transmit the first data to the first edge server 121 in operation 527. The processor 360 may transmit the first data to the first edge server 121 through the first wireless network. According to various example embodiments, the processor 360 may transmit the first data to the first edge server 121 through the first communication module 341. The end device 110 may return to FIG. 4 and may perform operation 417.

On the contrary, when it is determined that the large capacity transmission rather than the lower latency transmission is prioritized for the first data in operation 521, the end device 110 may determine whether the end device 110 is connected to the second edge server 123 in operation 523. The processor 360 may verify a connection state with the second edge server 123 through the second wireless network. According to various example embodiments, the processor 360 may verify the connection state with the second edge server 123 through the second communication module 343. Through this, the processor 360 may determine whether connection with the second edge server 123 is maintained.

When it is determined that the end device 110 is connected to the second edge server 123 in operation 523, the end device 110 may transmit the first data to the second edge server 123 in operation 525. The processor 360 may transmit the first data to the second edge server 123 through the second wireless network. According to various example embodiments, the processor 360 may transmit the first data to the second edge server 123 through the second communication module 343. The end device 110 may return to FIG. 4 and may perform operation 417.

On the contrary, when it is determined that the end device 110 is not connected to the second edge server 123 in operation 523, the end device 110 may transmit the first data to the first edge server 121 in operation 527. The processor 360 may transmit the first data to the first edge server 121 through the first wireless network. According to various example embodiments, the processor 360 may transmit the first data to the first edge server 121 through the first communication module 341. That is, when the end device 110 is not connected to the second edge server 123, the processor 360 may transmit the first data to the first edge server 121 although the large capacity transmission rather than the lower latency transmission is prioritized for the first data. The end device 110 may return to FIG. 4 and may perform operation 417.

Figure 5C:
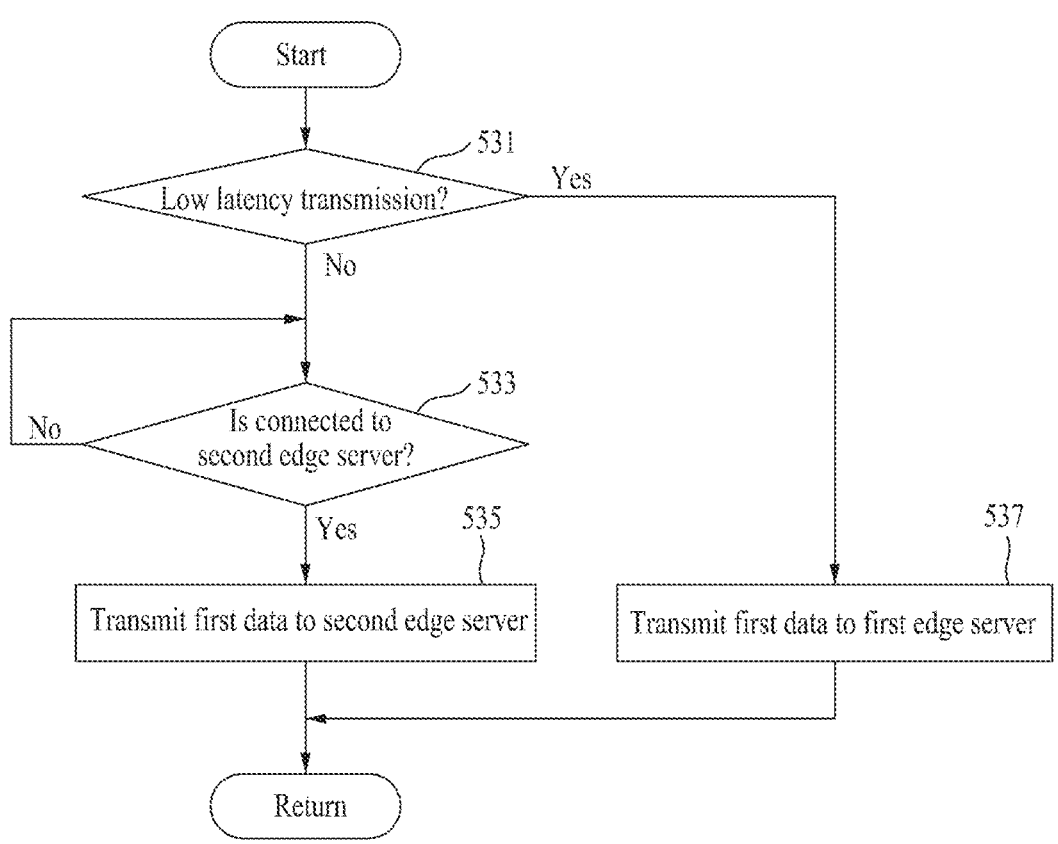

FIG. 5C is a flowchart illustrating another example of an operation of transmitting first data to the edge server 120 of FIG. 4 according to various example embodiments. According to various example embodiments, the edge server 120 may include the first edge server 121 of the first wireless network and the second edge server 123 of the second wireless network. The communication module 340 of the end device 110 may include the first communication module 341 configured to communicate using the first wireless network and the second communication module 343 configured to communicate using the second wireless network.

Referring to FIG. 5C, in operation 531, the end device 110 may determine whether lower latency transmission is prioritized for first data. The processor 360 may determine whether lower latency transmission is prioritized or whether large capacity transmission rather than the lower latency transmission is prioritized for the first data, based on at least one of the first data and/or a control command to be received from the edge server 120 in response to the first data. For example, the processor 360 may determine whether the lower latency transmission is prioritized or whether the large capacity transmission is prioritized for the first data based on a data type of the first data, a resource used to transmit the first data, and/or the like. For example, when the first data includes localization data or when the control command to be received in response to the first data is to be received with map information, the processor 360 may determine that the large capacity transmission is prioritized for the first data. Otherwise, the processor 360 may determine that the lower latency transmission is prioritized for the first data.

When it is determined that the lower latency transmission is prioritized for the first data in operation 531, the end device 110 may transmit the first data to the first edge server 121 in operation 537. The processor 360 may transmit the first data to the first edge server 121 through the first wireless network. According to various example embodiments, the processor 360 may transmit the first data to the first edge server 121 through the first communication module 341. The end device 110 may return to FIG. 4 and may perform operation 417.

On the contrary, when it is determined that the large capacity transmission rather than the lower latency transmission is prioritized for the first data in operation 531, the end device 110 may determine whether the end device 110 is connected to the second edge server 123 in operation 533. The processor 360 may verify a connection state with the second edge server 123 through the second wireless network. According to various example embodiments, the processor 360 may verify the connection state with the second edge server 123 through the second communication module 343. Through this, the processor 360 may determine whether connection with the second edge server 123 is maintained.

When it is determined that the end device 110 is connected to the second edge server 123 in operation 533, the end device 110 may transmit the first data to the second edge server 123 in operation 535. The processor 360 may transmit the first data to the second edge server 123 through the second wireless network. According to various example embodiments, the processor 360 may transmit the first data to the second edge server 123 through the second communication module 343. The end device 110 may return to FIG. 4 and may perform operation 417.

On the contrary, when it is determined that the end device 110 is not connected to the second edge server 123 in operation 533, the end device 110 may wait until the end device 110 is connected to the second edge server 123. The processor 360 may wait without transmitting the first data until the end device 110 is reconnected to the second edge server 123. When it is determined that the end device 110 is connected to the second edge server 123 in operation 533, the end device 110 may transmit the first data to the second edge server 123 in operation 535. The processor 360 may transmit the first data to the second edge server 123 through the second wireless network. According to various example embodiments, the processor 360 may transmit the first data to the second edge server 123 through the second communication module 343. That is, when the large capacity transmission rather than the lower latency transmission is prioritized for the first data, the processor 360 may transmit the first data only to the second edge server 123. The end device 110 may return to FIG. 4 and may perform operation 417.

An operation method of the end device 110 according to various example embodiments may include wirelessly connecting to the edge server 120 managed by the cloud server 130; wirelessly receiving a control command from the edge server 120; and operating according to the control command.

According to various example embodiments, the edge server 120 may include the first edge server 121 of the first wireless network and the second edge server 123 of the second wireless network.

For example, the first wireless network may be a long-distance wireless network and the second wireless network may be a short-range wireless network.

According to various example embodiments, the end device 110 may include the driving module 330 configured to perform a physical operation.

According to various example embodiments, the operating may include operating the driving module 330 based on the control command.

According to various example embodiments, the receiving may include collecting data; wirelessly transmitting the data to the edge server 120; and wirelessly receiving the control command generated based on the data from the edge server 120.

According to various example embodiments, the receiving may include generating data; transmitting the data to one of the first edge server 121 and/or the second edge server 123; and wirelessly receiving the control command from one of the first edge server 121 and/or the second edge server 123. For example, the receiving may further include determining which one is suitable for transmitting data between the first wireless network and the second wireless network based on at least one of a type of the data, a resource used to transmit the data, and a resource corresponding to the control command to be received in response to the data.

For example, the generating may further include generating data and classifying the data into at least one of a first type corresponding to the first wireless network and/or a second type corresponding to the second wireless network. The transmitting may include transmitting the first type of the data to the first edge server through the first wireless network and transmitting the second type of the data to the second edge server through the second wireless network.

As another example, the generating may include generating the first type of the data corresponding to the first wireless network; generating the second type of the data corresponding to the second wireless network; transmitting the first type of the data to the first edge server through the first wireless network; and transmitting the second type of the data to the second edge server through the second wireless network.

According to various example embodiments, the method may further include detecting a failure of a wireless connection state with the edge server 120; and suspending an operation.

According to various example embodiments, the method may further include detecting resolution of the failure and waiting to receive the control command.

According to various example embodiments, the operating may include performing a software update according to the control command.

Figure 6A:
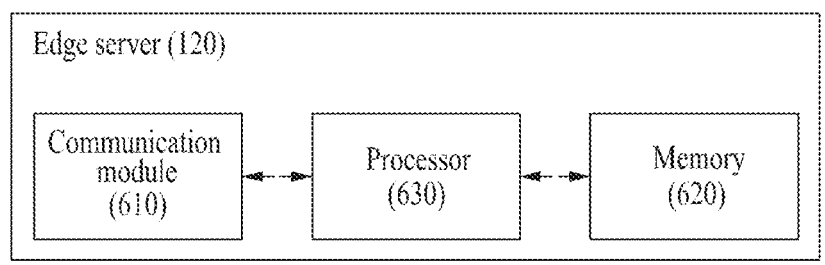
FIG. 6A is a diagram illustrating an edge server according to various example embodiments.
Figure 6B:
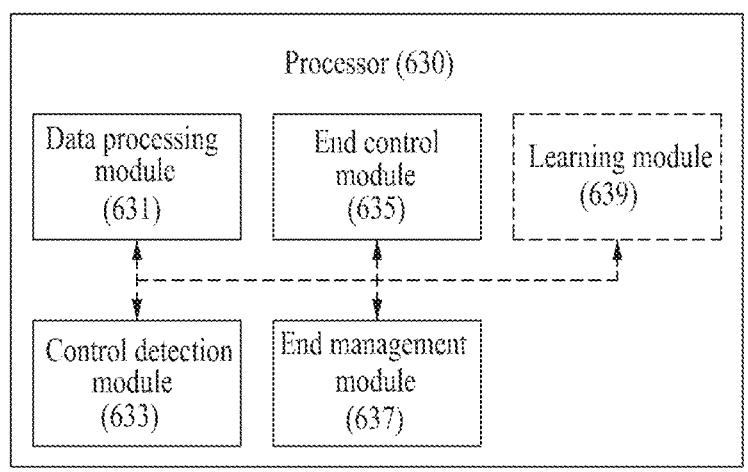
FIG. 6B is a diagram illustrating a processor of FIG. 6A.

FIG. 6A is a diagram illustrating the edge server 120 according to various example embodiments. FIG. 6B is a diagram illustrating a processor 630 of FIG. 6A.

Referring to FIG. 6A, the edge server 120 according to various example embodiments may include at least one of a communication module 610, a memory 620, and/or the processor 630. In various example embodiments, at least one of the components of the edge server 120 (e.g., the communication module 610, the memory 620, and/or the processor 630) may be omitted and at least one other component may be added. In various example embodiments, at least two of the components of the edge server 120 may be implemented as a single integrated circuit. According to various example embodiments, the edge server 120 may function as a server for the end device 110 and may function as a client for the cloud server 130. The edge server 120 may function as a brain of (e.g., to perform processing and/or control of) the end device 110 and may control the end device 110.

The communication module 610 may support communication with an external device in the edge server 120 (e.g., wireless communication between the edge server 120 and the external device). According to various example embodiments, the communication module 610 may support establishing a wireless channel with the external device and performing communication through the communication channel. According to various example embodiments, the communication module 610 may include a first communication module and a second communication module. The first communication module may communicate with the end device 110 through a wireless network that enables URLLC. The wireless network may include at least one of the first wireless network and/or the second wireless network. The first wireless network may include a long-distance wireless network, for example, a 5G network, and the second wireless network may include a short-range wireless network, for example, a WiFi-6 (WiFi ad/ay). The second communication module may communicate with the cloud server 130. For example, the second communication module may communicate with the cloud server 130 through the Internet. According to various example embodiments, the first communication module and the second communication module may be integrated into a single component (e.g., a single chip) or may be implemented as separate components (e.g., a plurality of chips). The communication module 610 may verify and authenticate the edge server 120 based on stored identification information.

According to various example embodiments, the edge server 120 may be one of the first edge server 121 and/or the second edge server 123. When the edge server 120 is the first edge server 121, the communication module 610, that is, the first communication module may communicate with the end device 110 through the first wireless network, for example, a 5G network. When the edge server 120 is the second edge server 123, the communication module 610, that is, the first communication module may communicate with the end device 110 through the second wireless network, for example, a WiFi-6 (WiFi ad/ay).

The memory 620 may store data used by at least one of the components of the edge server 120. The memory 620 may include a volatile memory and/or a nonvolatile memory.

The processor 630 may control the overall operation of the edge server 120. The processor 630 may communicate with each of the end device 110 and the cloud server 130 through the communication module 610. According to various example embodiments, referring to FIG. 6B, the processor 630 may include at least one of a data processing module 631, a control detection module 633, an end control module 635, an end management module 637, and/or a learning module 639.

The data processing module 631 may process data between the end device 110 and the cloud server 130. According to various example embodiments, the data processing module 631 may receive first data from the end device 110 through the communication module 610. The first data may include at least one of sensing data about an external environment of the end device 110 and/or state data about the end device 110. The data processing module 631 may process the first data. According to various example embodiments, the data processing module 631 may detect second data based on the first data. The second data may include at least one of a processing result of the first data and/or a request for the end device 110. For example, when the first data includes localization data of the end device 110, the data processing module 631 may estimate a position of the end device 110 (e.g., second data) based on the localization data. According to various example embodiments, the data processing module 631 may estimate a position of the end device 110 using a fine timing measurement (FTM) function. The data processing module 631 may transmit the second data to the cloud server 130 through the communication module 610. Also, the data processing module 631 may receive third data from the cloud server 130. The third data may include at least one of a processing result of the second data and a response to the request for the end device 110.

The control detection module 633 may determine a control command for the end device 110. According to various example embodiments, the control detection module 633 may determine the control command based on at least one of the first data and/or the third data. According to various example embodiments, the control command may be for controlling a motion of the end device 110. According to various example embodiments, the control command may be for updating software of the end device 110.

The end control module 635 may control the end device 110 using the control command. To this end, the end control module 635 may transmit the control command to the end device 110 through the communication module 610.

The end management module 637 may manage the end device 110 controlled by the edge server 120. According to various example embodiments, the end management module 637 may manage a single end device 110 and/or may also manage a plurality of end devices 110. According to various example embodiments, the end management module 637 may manage each of the end devices 110 based on identification information of each corresponding end device 110. For example, the end management module 637 may monitor each of the end devices 110 based on at least one of the first data, the second data, and/or the third data. The end management module 637 may design an operation plan related to each of the end devices 110, for example, a charging plan. Also, the end management module 637 may detect map information related to the end device 110.

The learning module 639 may perform machine learning based on the second data. According to various example embodiments, the learning module 639 may acquire at least a portion of the third data based on the second data. The learning module 639 may provide at least a portion of the third data to the control detection module 633.

The edge server 120 according to various example embodiments may include the communication module 610 configured to communicate with the cloud server 130 that is configured to manage at least one end device 110 and the edge server 120 and the processor 630 configured to connect to the communication module 610.

According to various example embodiments, the edge server 120 may include the first edge server 121 of the first wireless network and the second edge server 123 of the second wireless network.

For example, the first wireless network may be a long-distance wireless network and the second wireless network may be a short-range wireless network.

According to various example embodiments, the processor 630 may be configured to determine a control command for the end device 110 and wirelessly transmit the control command to the end device 110 through the communication module 610.

According to various example embodiments, the processor 630 may be configured to wirelessly receive the first data collected by the end device 110 through the communication module 610 and determine the control command based on the first data.

According to various example embodiments, the processor 630 may be configured to determine whether to cooperate with the cloud server 130 based on the first data and, when the processor 630 determines not to cooperate with the cloud server 130, determine the control command and transmit the control command within a set control period.

According to various example embodiments, when the processor 630 determines to cooperate with the cloud server 130, the processor 630 may be configured to process the first data, detect the second data from the first data, transmit the second data to the cloud server 130 through the communication module 610, receive the third data corresponding to the second data from the cloud server 130 through the communication module 610, and determine the control command using the third data.

According to various example embodiments, the processor 630 may be configured to receive update information from the cloud server 130 through the communication module 610 and determine the control command for updating software of the end device 110 based on the update information.

Figure 7A:
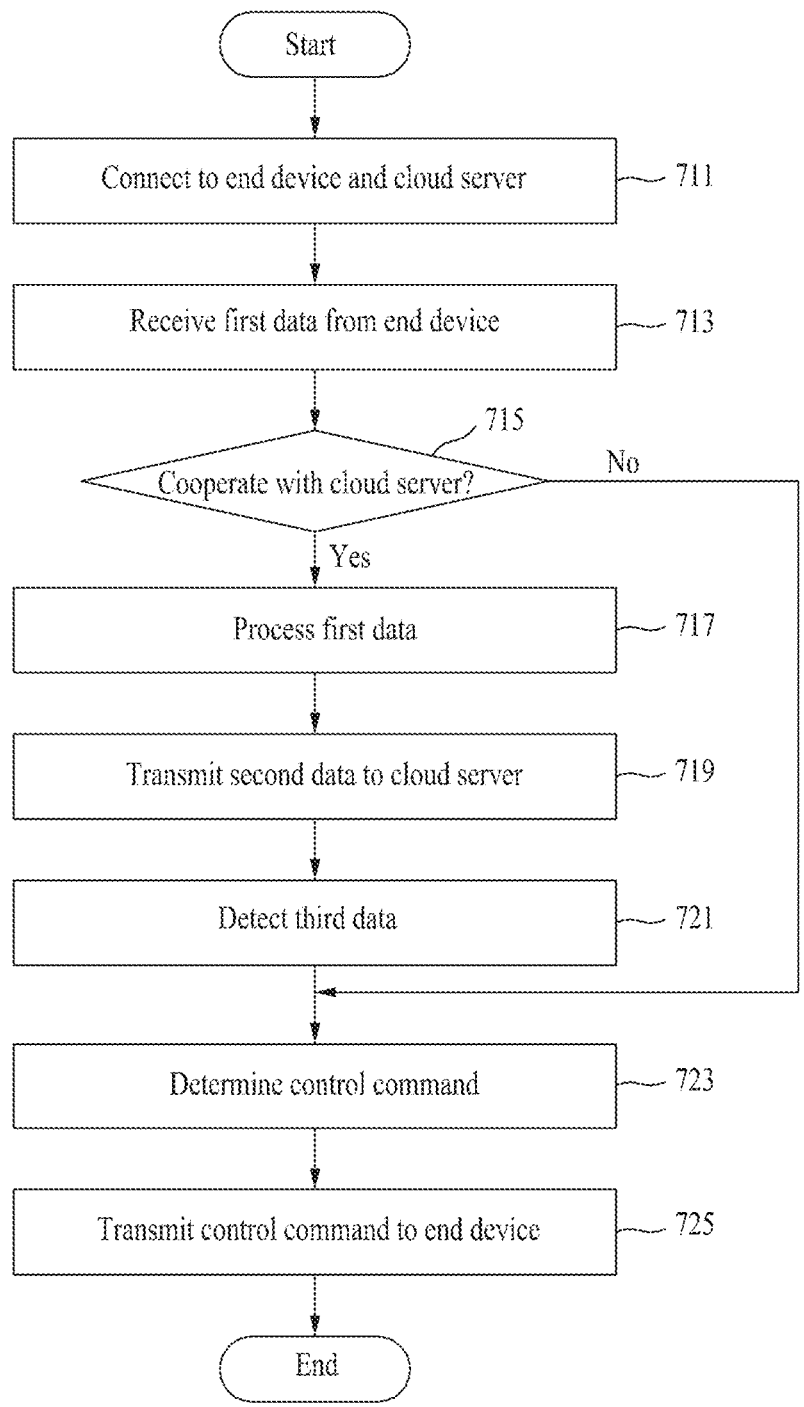
FIG. 7A is a flowchart illustrating an operation method of an edge server according to various example embodiments.

FIG. 7A is a flowchart illustrating an operation method of the edge server 120 according to various example embodiments.

Referring to FIG. 7A, in operation 711, the edge server 120 may be connected to the end device 110 and the cloud server 130. The processor 630 may be connected to the end device 110 and the cloud server 130 through the communication module 610. According to various example embodiments, the communication module 610 may be connected to the end device 110 through a wireless network that enables URLLC. The wireless network may include at least one of a first wireless network and/or a second wireless network. The first wireless network may include a long-distance wireless network, for example, a 5G network, and the second wireless network may include a short-range wireless network, for example, WiFi-6 WiFi (ad/ay). The communication module 610 may be connected to the cloud server 130, for example, through the Internet.

According to various example embodiments, the edge server 120 may be one of the first edge server 121 of the first wireless network and/or the second edge server 123 of the second wireless network. When the edge server 120 is the first edge server 121, the processor 630 may be connected to the end device 110 through the communication module 610. When the edge server 120 is the second edge server 123, the processor 630 may be connected to the end device 110 through the communication module 610. According to various example embodiments, as the end device 110 is positioned inside the communication coverage A of the second edge server 123, the processor 630 (e.g., the processor 630 of the second edge server 123) may be connected to the end device 110 through the communication module 610.

In operation 713, the edge server 120 may receive first data from the end device 110. The processor 630 may receive the first data from the end device 110 through the communication module 610. The first data may include at least one of sensing data about an external environment of the end device 110, state data about the end device 110, and/or a request used for an operation of the end device 110. For example, the state data may include at least one of identification information of the end device 110, battery (not shown) state information, and/or state information of the driving module 330.

In operation 715, the edge server 120 may determine whether to cooperate with the cloud server 130, to control the end device 110. According to various example embodiments, the edge server 120 may determine whether to cooperate with the cloud server 130 based on the first data. For example, the processor 630 may determine whether to cooperate with the cloud server 130 depending on whether the first data includes an indicator for indicating cooperation between the edge server 120 and the cloud server 130. When the first data does not include the indicator, the processor 630 may determine to independently control the end device 110. When the first data includes the indicator, the processor 630 may determine to control the end device 110 in cooperation with the cloud server 130. As another example, the processor 630 may determine whether to cooperate with the cloud server 130 based on an attribute, for example, at least one of a size and/or importance, of the first data. If the size of the first data is less than a set value or if the importance of the first data is less than a set standard, the processor 630 may determine to independently control the end device 110. If the size of the first data is greater than or equal to the set value, or if the importance of the first data is greater than or equal to the set standard, the processor 630 may determine to control the end device 110 in cooperation with the cloud server 130. As another example, the processor 630 may estimate an amount of time used to control the end device 110 based on the first data. According to various example embodiments, the processor 630 may estimate an amount of time used to control the end device 110 based on the attribute of the first data, or a current situation of at least one of the end device 110 and/or the edge server 120. When the amount of time used to control the end device 110 is estimated to be less than or equal to a set control period, the processor 630 may determine to independently control the end device 110. When the amount of time used to control the end device 110 is estimated to exceed the set control period, the processor 630 may determine to control the end device 110 in cooperation with the cloud server 130.

When the processor 630 determines to cooperate with the cloud server 130 in operation 715, the edge server 120 may process the first data in operation 717. The processor 630 may process the first data. According to various example embodiments, the processor 630 may detect second data based on the first data. The second data may include at least one of a processing result of the first data and/or a request for the end device 110. The processing result of the first data may include, for example, at least one of sensing data of the end device 110, state data of the end device 110, a position of the end device 110, a map related to the end device 110, at least one point of interest (POI), and/or a task processing level. The request for the end device 110 may include at least one of a data search request and/or a request for update information for updating software of the end device 110. To this end, the processor 630 may specify a position of the end device 110. Alternatively or additionally, the processor 630 may generate or update a map about a surrounding area of the end device 110. Alternatively or additionally, the processor 630 may extract a POI from the map about the surrounding area of the end device 110. Alternatively or additionally, the processor 630 may detect a task processing level of the end device 110. According to various example embodiments, when the first data includes an image that includes a person, the processor 630 may mosaic or blur an area related to the person from the image. In operation 719, the edge server 120 may transmit the second data to the cloud server 130. The processor 630 may transmit the second data to the cloud server 130 through the communication module 610.

In operation 721, the edge server 120 may detect third data. According to various example embodiments, the processor 630 may receive the third data from the cloud server 130 through the communication module 610. The third data may include at least one of a processing result of the second data and/or a response to the request for the end device 110. The processing result of the second data may include, for example, at least one of latest map information that is updated based on the map related to the end device 110 and/or a machine learning result using the second data. The response to the request for the end device 110 may include, for example, at least one of a data search result and/or update information for the end device 110. According to various example embodiments, the processor 630 may process the second data and may detect third data based on the second data. According to various example embodiments, the processor 630 may perform machine learning using the second data. The third data may represent the processing result of the second data. The processing result of the second data may include, for example, at least one of latest map information updated based on the map related to the end device 110, task information to be processed through the end device 110, and/or the machine learning result using the second data.

In operation 723, the edge server 120 may determine a control command for the end device 110. The processor 630 may determine the control command based on at least one of the first data and/or the third data. According to various example embodiments, the control command may be for controlling a motion of the end device 110. According to various example embodiments, the processor 630 may determine the control command based on at least one of a position of the end device 110, the map related to the end device 110, and/or at least one POI. For example, the control command may include at least one of position coordinates, and/or a speed value, of at least one of a travel route and/or a target position of the end device 110. As another example, the control command may include manipulation variables for processing a task using the end device 110. According to various example embodiments, the control command may be for updating software of the end device 110. In operation 725, the edge server 120 may transmit the control command to the end device 110. The processor 630 may transmit the control command to the end device 110 through the communication module 610.

When the processor 630 determines not to cooperate with the cloud server 130 in operation 715, the edge server 120 may determine the control command for the end device 110 in operation 723. The processor 630 may determine the control command based on the first data. According to various example embodiments, the control command may be for controlling a motion of the end device 110. According to various example embodiments, the processor 630 may determine the control command based on at least one of the position of the end device 110, the map related to the end device 110, and/or at least one POI. For example, the control command may include at least one of position coordinates, and/or a speed value, of at least one of a travel route and/or a target position of the end device 110. As another example, the control command may include manipulation variables for processing a task using the end device 110. In operation 725, the edge server 120 may transmit the control command to the end device 110. The processor 630 may transmit the control command to the end device 110 through the communication module 610. According to various example embodiments, the edge server 120 may determine the control command based on the first data and may transmit the control command within a set control period. The control period may be determined based on a sum of an amount of time used to determine the control command based on the first data and an amount of time used to transmit the control command to the end device 110. For example, the set control period may be 5 ms and the edge server 120 may determine the control command based on the first data for 4 ms and may transmit the control command to the end device 110 for 1 ms. According to various example embodiments, the second edge server 123 may transmit the control command with map information related to the end device 110.

Figure 7B:
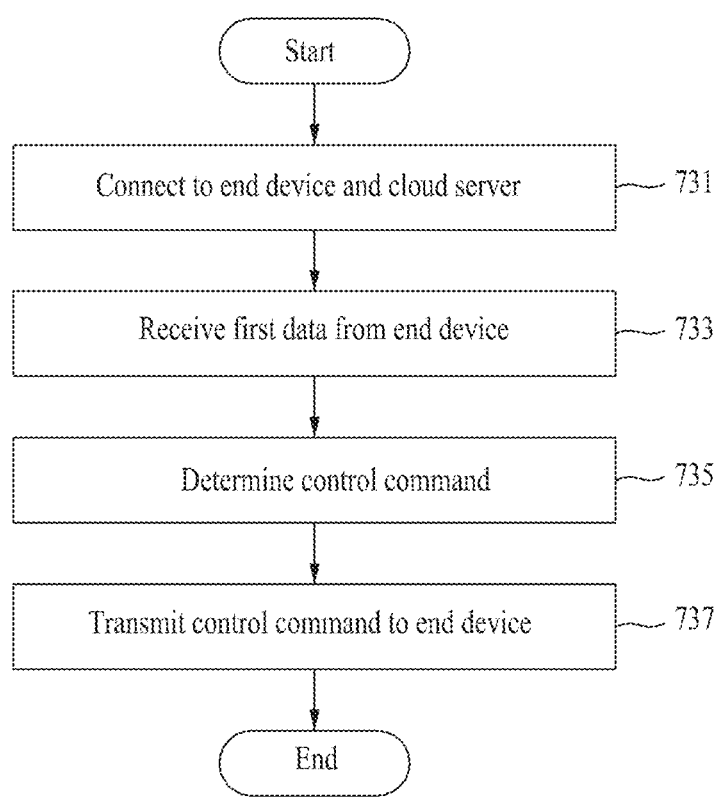
FIG. 7B is a flowchart illustrating an operation method of an edge server according to various example embodiments.

According to various example embodiments, the edge server 120 may be one of the first edge server 121 of the first wireless network and/or the second edge server 123 of the second wireless network. In this case, the first edge server 121 and the second edge server 123 may operate in the same manner or similar manners. According to various example embodiments, as illustrated in FIG. 7A, the first edge server 121 and the second edge server 123 may individually operate. According to various example embodiments, the first edge server 121 may communicate with the end device 110 through the first wireless network, for example, a 5G network, and the second edge server 123 may communicate with the end device 110 through the second wireless network, for example, WiFi-6 (WiFi ad/ay). Alternatively, each of the first edge server 121 and the second edge server 123 may operate in a different manner. According to various example embodiments, the first edge server 121 may operate as illustrated in FIG. 7B and the second edge server 123 may operate as illustrated in FIG. 7A. Likewise, the first edge server 121 may communicate with the end device 110 through the first wireless network, for example, a 5G network, and the second edge server 123 may communicate with the end device 110 through the second wireless network, for example, a WiFi-6 (WiFi ad/ay).

FIG. 7B is a flowchart illustrating an operation method of the edge server 120 according to various example embodiments. FIG. 7B illustrates an operation method of the first edge server 121.

Referring to FIG. 7B, in operation 731, the first edge server 121 may be connected to the end device 110 and the cloud server 130. The processor 630 may be connected to the end device 110 and the cloud server 130 through the communication module 610. According to various example embodiments, the communication module 610 may be connected to the end device 110 through the first wireless network that enables URLLC. The first wireless network may include a long-distance wireless network, for example, a 5G network. The communication module 610 may be connected to the cloud server 130, for example, through the Internet.

In operation 733, the first edge server 121 may receive first data from the end device 110. The processor 630 may receive the first data from the end device 110 through the communication module 610. The first data may include at least one of sensing data about an external environment of the end device 110, state data about the end device 110, and/or a request used for an operation of the end device 110. For example, the state data may include at least one of identification information of the end device 110, battery (not shown) state information, and/or state information of the driving module 330.

In operation 735, the first edge server 120 may determine a control command for the end device 110. The processor 630 may determine the control command based on the first data. For example, the control command may be for controlling a motion of the end device 110. According to various example embodiments, the processor 630 may determine the control command based on at least one of a position of the end device 110, a map related to the end device 110, and/or at least one POI. For example, the control command may include at least one of position coordinates, and/or a speed value, of at least one of a travel route and/or a target position of the end device 110. As another example, the control command may include manipulation variables for processing a task using the end device 110. In operation 737, the first edge server 121 may transmit the control command to the end device 110. The processor 630 may transmit the control command to the end device 110 through the communication module 610.

According to various example embodiments, the first edge server 121 may operate as illustrated in FIG. 7B and the second edge server 123 may operate as illustrated in FIG. 7A. That is, the second edge server 123 may determine the control command based on the first data, or may detect the third data in cooperation with the cloud server 130 and may determine the control command based on the third data. For example, the control command may be for controlling a motion of the end device 110 and/or also may be for updating software of the end device 110. Through this, the second edge server 123 may transmit the control command to the end device 1110. According to various example embodiments, the second edge server 123 may also transmit the control command with map information related to the end device 110.

An operation method of the edge server 120 according to various example embodiments may include wirelessly connecting to at least one end device 110 during connection to the cloud server 130 that is configured to manage the edge server 120; determining a control command for the end device 110; and wirelessly transmitting the control command to the end device 110.

According to various example embodiments, the edge server 120 may be the first edge server 121 of the first wireless network or the second edge server 123 of the second wireless network.

For example, the first wireless network may be a long-distance wireless network and the second wireless network may be a short-range wireless network.

According to various example embodiments, the determining may include wirelessly receiving first data collected by the end device 110; and determining the control command based on the first data.

According to various example embodiments, the determining may further include processing the first data and detecting second data from the first data; transmitting the second data to the cloud server 130; receiving third data corresponding to the second data from the cloud server 130; and determining the control command based on the third data.

According to various example embodiments, the transmitting may include receiving update information from the cloud server 130; and determining the control command for updating software of the end device 110 based on the update information.

Figure 8A:
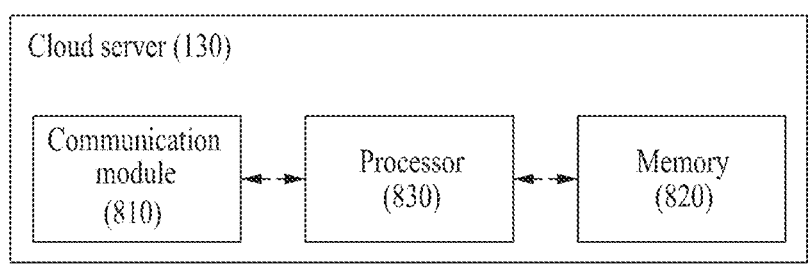
FIG. 8A is a diagram illustrating a cloud server according to various example embodiments.
Figure 8B:
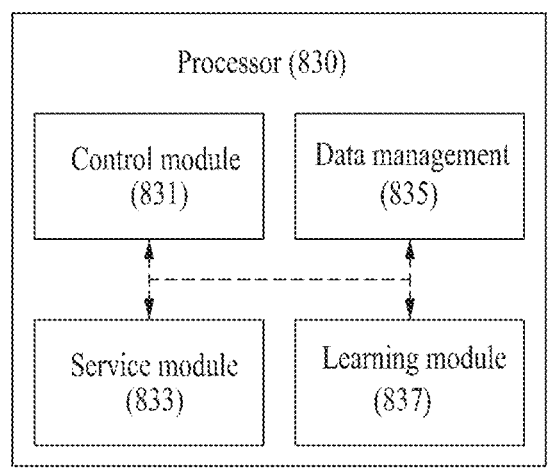
FIG. 8B is a diagram illustrating a processor of FIG. 8A.

FIG. 8A is a diagram illustrating the cloud server 130 according to various example embodiments. FIG. 8B illustrates a processor 830 of FIG. 8A.

Referring to FIG. 8A, the cloud server 130 according to various example embodiments may include at least one of a communication module 810, a memory 820, and/or the processor 830. In various example embodiments, at least one of the components of the cloud server 130 (e.g., the communication module 810, the memory 820 and/or the processor 830) may be omitted and at least one other component may be added. In various example embodiments, at least two of the components of the cloud server 130 may be implemented as a single integrated circuit.

The communication module 810 may support communication with an external device in the cloud server 130 (e.g., wireless communication between the cloud server 130 and the external device). According to various example embodiments, the communication module 810 may support establishing a wireless communication channel with the external device and performing communication through the communication channel. According to various example embodiments, the communication module 810 may communicate with the edge server 120. For example, the communication module 810 may communicate with the edge server 120 through the Internet. The communication module 810 may verify and authenticate the cloud server 130 based on stored identification information.

The memory 820 may store data used by at least one of the components of the cloud server 130. The memory 820 may include a volatile memory and/or a non-volatile memory.

The processor 830 may control the overall operation of the cloud server 130. The processor 830 may communicate with the edge server 120 through the communication module 810. According to various example embodiments, referring to FIG. 8B, the processor 830 may include at least one of a control module 831, a service module 833, a data management module 835, and/or a learning module 837.

The control module 831 may manage the end device 110 and/or the edge server 120. According to various example embodiments, the control module 831 may manage the end device 110 and the edge server 120 based on identification information of the end device 110 and identification information of the edge server 120. The control module 831 may manage the end device 110 and the edge server 120 by associating the edge server 120 with the end device 110 controlled by the edge server 120. According to various example embodiments, the control module 831 may manage a state of the end device 110 and/or a state of the edge server 120.

The service module 833 may provide a cloud service for at least one of the end device 110 and/or the edge server 120. According to various example embodiments, the service module 833 may receive second data from the edge server 120 through the communication module 810. The second data may include at least one of a processing result of the first data and/or a request for the end device 110. The service module 833 may transmit third data to the edge server 120 through the communication module 810. The third data may include at least one of a processing result of the second data and/or a response to the request for the end device 110.

The data management module 835 may store a variety of information for the cloud service. For example, the data management module 835 may store map information or task information. The task information may include, for example, at least one task model able to be processed by the end device 110. The data management module 835 may update information based on the first data or the third data. For example, the data management module 835 may update the map information based on a map about a surrounding area of the end device 110.

The learning module 837 may process the second data. According to various example embodiments, the learning module 837 may perform machine learning based on the second data. Through this, the learning module 837 may acquire the third data based on the second data.

The cloud server 130 according to various example embodiments may include the communication module 810 configured to communicate with at least one edge server 120 that is configured to control at least one end device 110 and the processor 830 configured to connect to the communication module 810.

According to various example embodiments, the processor 830 may be configured to receive data related to the end device 110 from the edge server 120 through the communication module 810 and process the data.

According to various example embodiments, the data may include second data detected by the edge server 120 from first data collected by the end device 110.

According to various example embodiments, the processor 830 may be configured to process the second data, detect third data corresponding to the second data, and transmit the third data to the edge server 120 through the communication module 810.

According to various example embodiments, the processor 830 may be configured to transmit update information for updating software of the end device 110 to the edge server 120 through the communication module 810.

According to various example embodiments, the edge server 120 may include at least one of the first edge server 121 of the first wireless network and/or the second edge server 123 of the second wireless network.

For example, the first wireless network may be a long-distance wireless network and the second wireless network may be a short-range wireless network.

Figure 9:
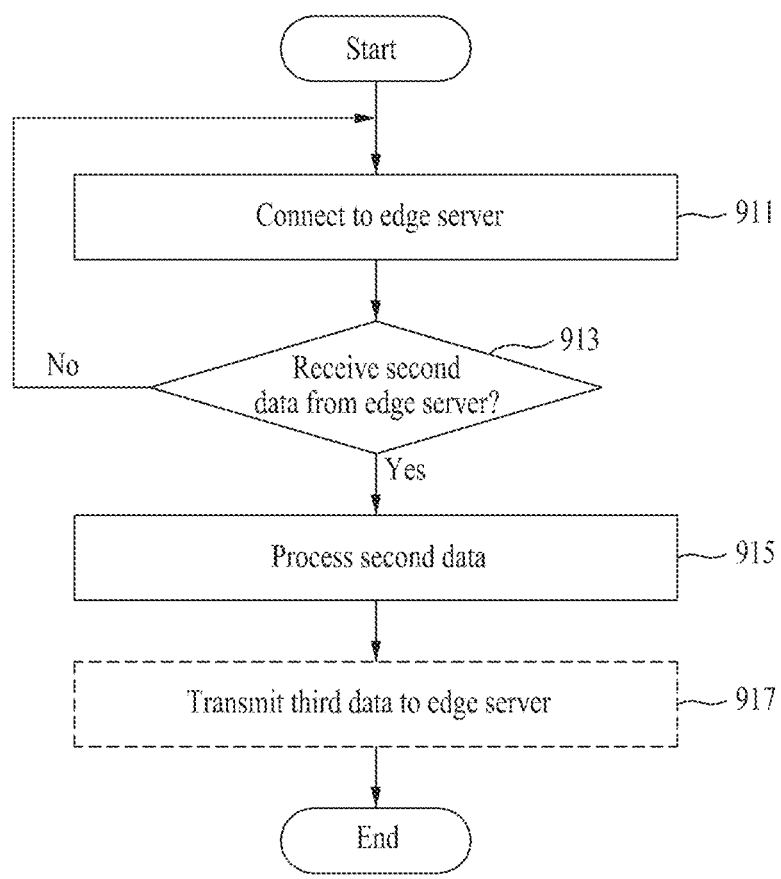
FIG. 9 is a flowchart illustrating an operation method of a cloud server according to various example embodiments.

FIG. 9 is a flowchart illustrating an operation method of the cloud server 130 according to various example embodiments.

Referring to FIG. 9, in operation 911, the cloud server 130 may be connected to the edge server 120. The processor 830 may be connected to the edge server 120 through the communication module 810. For example, the communication module 810 may be connected to the edge server 120 through the Internet.

In operation 913, the cloud server 130 may receive second data from the edge server 120. The processor 830 may receive the second data from the edge server 120 through the communication module 810. The second data may include at least one of a processing result of the first data and/or a request for the end device 110. The processing result of the first data may include, for example, at least one of sensing data of the end device 110, state data of the end device 110, a position of the end device 110, a map related to the end device 110, at least one POI, and/or a task processing level of the end device 110. The request for the end device 110 may include at least one of a data search request and/or a request for update information for updating software of the end device 110.

In operation 915, the cloud server 130 may process the second data. The processor 830 may process the second data. According to various example embodiments, the processor 830 may detect third data based on the second data. To this end, the processor 830 may perform machine learning using the second data. The third data may include at least one of a processing result of the second data and/or a response to the request for the end device 110. The processing result of the second data may include, for example, at least one of latest map information that is updated based on the map related to the end device 110, task information to be processed through the end device 110, and/or a machine learning result using the second data. The response to the request for the end device 110 may include, for example, at least one of a data search result and/or update information for the end device 110.

According to various example embodiments, in operation 917, the cloud server 130 may transmit the third data to the edge server 120. The processor 830 may transmit the third data to the edge server 120 through the communication module 810. For example, the processor 830 may transmit at least one of the processing result of the second data and/or the response to a request for the end device 110 as the third data. As another example, the processor 830 may transmit the response to the request for the end device 110 as the third data without transmitting the processing result of the second data. That is, although the processing result using the second data is detected as the third data, the processor 830 may not transmit the same.

On the contrary, when the cloud server 130 does not receive second data from the edge server 120 in operation 913, the cloud server 130 may return to operation 911. For example, the cloud server 130 may re-connect to the edge server 911. Alternatively or additionally, the cloud server 130 may wait until the second data is received from the edge server 120. When the second data is received from the edge server 120 in operation 913, the cloud server 130 may process the second data in operation 915.

An operation method of the cloud server 130 according to various example embodiments may include connecting to at least one edge server 120 that is configured to control at least one end device 110; receiving data related to the end device 110 from the edge server 120; and processing the data.

According to various example embodiments, the data may include second data detected by the edge server 120 from first data collected by the end device 110.

According to various example embodiments, the processing may include processing the second data and detecting third data corresponding to the second data; and transmitting the third data to the edge server 120.

According to various example embodiments, the method may further include transmitting update information for updating software of the end device 110 to the edge server 120.

According to various example embodiments, the edge server 120 may include at least one of the first edge server 121 of the first wireless network and/or the second edge server 123 of the second wireless network.

For example, the first wireless network may be a long-distance wireless network and the second wireless network may be a short-range wireless network.

According to various example embodiments, the edge server 120 may function as a brain of (e.g., to perform processing and/or control of) the at least one end device 110 and may wirelessly control the end device 110. That is, since the edge server 120 processes a control command for the end device 110, the end device 110 may operate according to the control command. Accordingly, higher processing performance is not demanded from the end device 110. Manufacturing cost of the end device 110 may be reduced and an amount of power consumed by the end device 110 may be reduced. Regardless of a size of the end device 110, higher performance and higher precision operation may be achieved. In addition, the edge server 120 may control a plurality of end devices 110 based on higher processing performance. In the communication system 100 that includes the end device 110 and the edge server 120, the efficiency of using resources including cost or power may be improved. Also, since the cloud server 130 updates software of the end device 110 through the edge server 120, the end device 110 may be maintained up to date.

According to various example embodiments, in the communication system 100, the first edge server 121 of the first wireless network and the second edge server 123 of the second wireless network may operate complementarily. The first edge server 121 may enable lower latency transmission for the end device 110 and the second edge server 123 may enable large capacity transmission for the end device 110. According to various example embodiments, the second edge server 123 may estimate a position of the end device 110 using localization data received from the end device 110. In addition, the end device 110 may operate even in a shadowing area through the first edge server 121 and the second edge server 123.

A trade-off exists between a larger and smaller processors. For example, a larger processor is capable of higher performance (e.g., throughput, quantity of computations, complexity of computations, etc.) and higher precision (e.g., computations of higher precision), but is more costly to manufacture, consumes greater resources (e.g., power, etc.), and its large physical size limits the types of applications for which the larger processor is useful. On the contrary, a smaller processor is less costly to manufacture, consumes fewer resources (e.g., power, etc.), and is useful for a wide variety of applications (e.g., mobile, battery-powered devices, etc.) due to its smaller physical size, but is less capable of higher performance (e.g., throughput, quantity of computations, complexity of computations, etc.) and higher precision (e.g., computations of higher precision).

Conventional devices and methods for controlling a robot involve incorporating a larger processor in the robot to enable higher performance (e.g., throughput, quantity of computations, complexity of computations, etc.) and higher precision (e.g., computations of higher precision). Accordingly, the conventional devices and methods are excessively costly and consume excessive resources (e.g., power, etc.). Also, the conventional devices and methods are unable to, or experience difficulty in, implementing a small-sized robot due to the physical size of the larger processor.

However, various example embodiments provide improved devices and methods for controlling a robot through the use of an edge server and/or cloud server. For example, the edge server and/or cloud server receives data from the robot, performs computations (e.g., higher performance and/or higher precision computations), and returns control commands to the robot. Accordingly, the robot is able to operate according to the results of higher performance and/or higher precision computations while also incorporating a smaller processor in the robot, and thereby overcoming the deficiencies of the conventional devices and methods by reducing manufacturing costs and resource consumption while permitting the implementation of a small-sized robot.

According to various example embodiments, operations described herein as being performed by the end device 110, the edge server 120, the cloud server 130, the first edge server 121, the second edge server 123, the processor 360, the data generator 361, the data transmitter 365, the first data generator 362, the second data generator 363, the processor 630, the data processing module 631, the control detection module 633, the end control module 635, the end management module 637, the learning module 639, the processor 830, the control module 831, the service module 833, the data management module 835, and/or the learning module 837 may be performed using, for example, hardware including logic circuits; a hardware/software combination such as at least one processor executing software; or a combination thereof. For example, such hardware may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In various example embodiments, the hardware including logic circuits; the hardware/software combination (e.g., the at least one processor executing software); or the combination thereof may perform some operations (e.g., the operations described herein as being performed by the machine learning model, the learning module 639 and/or the learning module 837) by artificial intelligence and/or machine learning. As an example, the hardware including logic circuits; the hardware/software combination (e.g., the at least one processor executing software); or the combination thereof may implement an artificial neural network that is trained on a set of training data by, for example, a supervised, unsupervised, and/or reinforcement learning model, and wherein the hardware including logic circuits; the hardware/software combination (e.g., the at least one processor executing software); or the combination thereof may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the hardware including logic circuits; the hardware/software combination (e.g., the at least one processor executing software); or the combination thereof may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

Various example embodiments and the terms used herein are not construed to limit the techniques described herein to specific examples and may be understood to include various modifications, equivalents, and/or substitutions. Like reference numerals refer to like elements throughout in relation to description of the drawings. As used herein, the singular forms "a," "an," and "the," are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, software, or firmware, and may be interchangeably used with, for example, the terms "logic," "logic block," "part," "circuit," etc. The module may be an integrally configured part, a minimum or smallest unit that performs at least one function, or a portion thereof. For example, the module may be configured as an application-specific integrated circuit (ASIC).

Various example embodiments disclosed herein may be implemented as software that includes one or more commands stored in a storage medium (e.g., the memory 350, the memory 620, and the memory 820) readable by a machine (e.g., the end device 110, the edge server 120, and the cloud server 130). For example, a processor (e.g., the processor 360, the processor 630, and the processor 830) of the machine may call at least one command from among the one or more commands stored in the storage medium and may execute the same. This enables the machine to perform at least one function according to the called at least one command. The one or more commands may include a code generated by a compiler or a code executable by an interpreter. The storage medium readable by the machine may be provided in a form of a non-transitory storage medium. "Non-transitory" may represent that the storage medium is a tangible device and does not include a signal (e.g., an electromagnetic wave) and the term does not distinguish a case in which data is semi-permanently stored in the storage medium and a case in which the data is temporarily stored.

According to various example embodiments, each component (e.g., module or program) of the aforementioned components may include a singular entity or a plurality of entities. According to various example embodiments, at least one component or operation among the aforementioned components or operations may be omitted, or at least one other component or operation may be added. Alternately or additionally, the plurality of components (e.g., module or program) may be integrated into a single component. In this case, the integrated component may perform the same or similar functionality as being performed by a corresponding component among a plurality of components before integrating at least one function of each component of the plurality of components. According to various example embodiments, operations performed by a module, a program, or another component may be performed in parallel, repeatedly, or heuristically, or at least one of the operations may be performed in different order or omitted. Alternatively, at least one other operation may be added.

What is claimed is:

1. An end device comprising:
   a memory storing computer-readable instructions; and
   at least one processor configured to execute the computer-readable instructions to cause the end device to,
   send first data, second data and third data to at least one edge server, the first data including localization data of the end device, the second data including state data of the end device, the third data including a request corresponding to the end device, and the at least one edge server being managed by a cloud server,
   receive a first control command, a second control command and a third control command from the at least one edge server through wireless communication, the first control command corresponding to the first data, the second control command corresponding to the second data, and the third control command corresponding to the third data,
   control the end device to change position according to the first control command,
   control the end device to process a task according to the second control command, and
   control the end device to perform a software update according to the third control command.

2. The end device of claim 1, wherein
   the at least one edge server comprises:
   a first edge server connected to a first wireless network, and
   a second edge server connected to a second wireless network; and
   the at least one processor is configured to execute the computer-readable instructions to,
   generate the first data, the second data and the third data,
   transmit each of the first data, the second data and the third data to one of the first edge server or the second edge server through wireless communication, and
   receive each of the first control command, the second control command and the third control command from one of the first edge server or the second edge server through wireless communication.

3. The end device of claim 2, wherein the at least one processor is configured to execute the computer-readable instructions to determine a network among the first wireless network and the second wireless network for transmitting each of the first data, the second data and the third data based on a type of the first data, a type of the second data and a type of the third data, the first wireless network being a different network type from the second wireless network.

4. The end device of claim 2, wherein the at least one processor is configured to execute the computer-readable instructions to transmit a first type of data to the first edge server through the first wireless network and transmit a second type of data to the second edge server through the second wireless network.

5. An operation method performed by the end device of claim 1, the method comprising:
   wirelessly connecting to the at least one edge server managed by the cloud server;
   wirelessly receiving the first control command, the second control command and the third control command from the at least one edge server; and
   operating according to the first control command, the second control command and the third control command.

6. An edge server for controlling a plurality of end devices, the edge server being communicatively coupled to a cloud server that is configured to manage the plurality of end devices and the edge server, the edge server comprising:
a memory storing computer-readable instructions; and
at least one processor configured to execute the computer-readable instructions to cause the edge server to,
receive first data from a first end device among the plurality of end devices, the first data including localization data of the first end device,
receive second data from a second end device among the plurality of end devices, the second data including state data of the second end device,
receive third data from a third end device among the plurality of end devices, the third data including a request corresponding to the third end device,
determine a first control command for the first end device based on the first data, a second control command for the second end device based on the second data, and a third control command for the third end device based on the third data, and
wirelessly transmit the first control command to the first end device to control the first end device to change position, the second control command to the second end device to control the second end device to process a task, and the third control command to the third end device to control the third end device to perform a software update.

7. The edge server of claim 6, wherein the at least one processor is configured to execute the computer-readable instructions to:
wirelessly receive the first data, the second data and the third data, the first data being collected by the first end device, the second data being collected by the second end device, and the third data being collected by the third end device.

8. The edge server of claim 7, wherein the at least one processor is configured to execute the computer-readable instructions to:
determine whether to cooperate with the cloud server based on the first data; and
perform one of,
determining the first control command in response to determining not to cooperate with the cloud server, and transmitting the first control command within a set control period, or
processing the first data in response to determining to cooperate with the cloud server, detecting fourth data from the first data, transmitting the fourth data to the cloud server, receiving fifth data corresponding to the fourth data from the cloud server, and determining the first control command based on the fifth data.

9. The edge server of claim 6, wherein the at least one processor is configured to execute the computer-readable instructions to:
receive update information from the cloud server; and
determine a fourth control command based on the update information, the fourth control command being configured to cause the first end device, the second end device or the third end device to update software.

10. An operation method performed by the edge server of claim 6, the method comprising:
wirelessly connecting to the first end device, the second end device and the third end device while maintaining a connection to the cloud server, the cloud server being configured to manage the edge server;
determining the first control command for the first end device, the second control command for the second end device and the third control command for the third end device; and
wirelessly transmitting the first control command to the first end device, the second control command to the second end device and the third control command to the third end device.

11. A cloud server comprising:
a memory storing computer-readable instructions; and
at least one processor configured to execute the computer-readable instructions to cause the cloud server to,
receive first data, second data, third data and fourth data from at least one edge server, the at least one edge server being configured to control a first end device, a second end device, a third end device and a fourth end device, the first data being related to the first end device, the second data being related to the second end device, the third data being related to the third end device, and the fourth data being related to the fourth end device,
process the first data to obtain updated map information,
process the second data to obtain task information,
process the third data to obtain a data search result, and
process the fourth data to obtain software update information.

12. The cloud server of claim 11, wherein
the first is detected by the at least one edge server based on fifth data collected by the first end device;
the second data is detected by the at least one edge server based on sixth data collected by the second end device;
the third data is detected by the at least one edge server based on seventh data collected by the third end device;
the fourth data is detected by the at least one edge server based on eighth data collected by the fourth end device; and
the at least one processor is configured to execute the computer-readable instructions to,
process the fifth data and detect ninth data corresponding to the fifth data,
process the sixth data and detect tenth data corresponding to the sixth data,
process the seventh data and detect eleventh data corresponding to the seventh data,
process the eighth data and detect twelfth data corresponding to the eighth data, and
transmit the ninth data, the tenth data, the eleventh data and the twelfth data to the at least one edge server.

13. The cloud server of claim 11, wherein the at least one processor is configured to execute the computer-readable instructions to:
transmit the software update information to the at least one edge server, the software update information corresponding to a software update for the fourth end device.

14. An operation method performed by the cloud server of claim 11, the method comprising:
connecting to the at least one edge server configured to control the first end device, the second end device, the third end device and the third end device;
receiving the first data, the second data, the third data and the fourth data related to the end device from the at least one edge server; and
processing the first data, the second data, the third data and the fourth data.

15. A communication system for three parties, the communication system comprising:
- at least one end device configured to collect first data, second data and third data, the first data including localization data of the at least one end device, the second data including state data of the at least one end device, and the third data including a request corresponding to the at least one end device;
- at least one edge server configured to wirelessly control the at least one end device; and
- a cloud server configured to connect to the at least one edge server, and manage the at least one end device and the at least one edge server, wherein
- the at least one edge server is configured to wirelessly receive the first data, the second data and the third data from the at least one end device, determine a first control command based on the first data, a second control command based on the second data and a third control command based on the third data, and wirelessly transmit the first control command, the second control command and the third control command to the at least one end device, and
- the at least one end device is configured to wirelessly receive the first control command, the second control command and the third control command from the at least one edge server, control the at least one end device to change position according to the first control command, control the at least one end device to process a task according to the second control command, and control the at least one end device to perform a software update according to the third control command.

16. The communication system of claim 15, wherein
the at least one edge server comprises a first edge server of a first wireless network and a second edge server of a second wireless network; and
the at least one end device is configured to,
- transmit each of the first data, the second data and the third data to one of the first edge server or the second edge server, and
- wirelessly receive each of the first control command, the second control command and the third control command from one of the first edge server or the second edge server.

17. The communication system of claim 16, wherein the first edge server is configured to:
- determine at least one of the first control command, the second control command or the third control command based on the first data, the second data or the third data, respectively; and
- transmit the at least one of the first control command, the second control command or the third control command to the at least one end device through the first wireless network.

18. The communication system of claim 16, wherein the second edge server is configured to:
- determine whether to cooperate with the cloud server based on the first data;
- determine the first control command within a set control period in response to determining not to cooperate with the cloud server;
- determine the first control command through communication with the cloud server based on the first data in response to determining to cooperate with the cloud server; and
- transmit the first control command to the at least one end device through the second wireless network.

19. An operation method performed by the communication system for three parties of claim 15, the method comprising:
- wirelessly connecting, by the at least one edge server, to the at least one end device while the at least one edge server is connected to the cloud server;
- collecting, by the at least one end device, the first data, the second data and the third data;
- wirelessly transmitting, by the at least one end device, the first data, the second data and the third data to the at least one edge server;
- determining, by the at least one edge server, the first control command based on the first data, the second control command based on the second data and the third control command based on the third data;
- wirelessly transmitting, by the at least one edge server, the first control command, the second control command and the third control command to the at least one end device; and
- operating, by the at least one end device, according to the first control command, the second control command and the third control command.

20. The end device of claim 3, wherein
the first wireless network is configured to perform Ultra-Reliable and Low Latency Communications (URLLC); and
the second wireless network is a Wireless Fidelity (WiFi) network.

* * * * *